United States Patent
Yamamoto

(10) Patent No.: US 9,776,578 B2
(45) Date of Patent: Oct. 3, 2017

(54) CLIP AND PILLAR GARNISH FIXING STRUCTURE

(71) Applicant: TOYOTA JIDOSHA KABUSHIKI KAISHA, Toyota-shi, Aichi-ken (JP)

(72) Inventor: Kazuhito Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/901,001

(22) PCT Filed: Jan. 16, 2015

(86) PCT No.: PCT/JP2015/051004
§ 371 (c)(1),
(2) Date: Dec. 22, 2015

(87) PCT Pub. No.: WO2015/108129
PCT Pub. Date: Jul. 23, 2015

(65) Prior Publication Data
US 2016/0375842 A1    Dec. 29, 2016

(30) Foreign Application Priority Data

Jan. 20, 2014  (JP) ................... 2014-007937

(51) Int. Cl.
*F16B 5/06* (2006.01)
*B60R 13/02* (2006.01)
(Continued)

(52) U.S. Cl.
CPC ............ *B60R 13/02* (2013.01); *B60R 21/213* (2013.01); *B60R 21/216* (2013.01); *F16B 2/10* (2013.01);
(Continued)

(58) Field of Classification Search
CPC ..... B60R 13/02; B60R 21/213; B60R 21/216; B60R 2021/2163; B60R 13/0206; F16B 2/10; F16B 2/185; F16B 19/00; F16B 21/082; F16B 5/065; Y10T 24/30; Y10T 24/309; Y10T 24/303
See application file for complete search history.

(56) References Cited

U.S. PATENT DOCUMENTS 4,422,222 A * 12/1983 Notoya ................. F16B 5/0642
24/289
4,762,437 A    8/1988 Mitomi
(Continued)

FOREIGN PATENT DOCUMENTS

JP    2008-230363 A    10/2008
JP    2011-133014 A    7/2011
(Continued)

OTHER PUBLICATIONS

Aug. 4, 2016 International Preliminary Report on Patentability issued in International Application No. PCT/JP2015/051004.

*Primary Examiner* — Robert J Sandy
*Assistant Examiner* — Michael Lee
(74) *Attorney, Agent, or Firm* — Oliff PLC

(57) ABSTRACT

The clip includes a first engagement hook and a second engagement hook. The first engagement hook engages the body when the clip is in a normal fitting with the body. The second engagement hook prevents the clip from being disengaged from the body when the first engagement hook has been disengaged from the body. When the first engagement hook is disengaged from the body, a member is lifted away from surrounding members to such an extent as can be recognized by sight. Therefore, a state that the clip is not in the normal fitting state with the body is noticeable. Even if the clip is coupled to the body in the non-fitting state or half-fitting state, the second engagement hook prevents the clip from being disengaged from the body.

15 Claims, 13 Drawing Sheets

(51) Int. Cl.
   *F16B 21/08*    (2006.01)
   *F16B 2/10*     (2006.01)
   *F16B 2/18*     (2006.01)
   *F16B 45/00*    (2006.01)
   *B60R 21/213*   (2011.01)
   *F16B 19/00*    (2006.01)
   *B60R 21/216*   (2011.01)

(52) U.S. Cl.
   CPC .............. *F16B 2/185* (2013.01); *F16B 5/065* (2013.01); *F16B 19/00* (2013.01); *F16B 21/082* (2013.01); *F16B 45/00* (2013.01); *B60R 2021/2163* (2013.01); *Y10T 24/309* (2015.01); *Y10T 24/42* (2015.01)

(56) References Cited

U.S. PATENT DOCUMENTS

| | | | |
|---|---|---|---|
| 2004/0052579 A1* | 3/2004 | Draggoo | B60R 13/0206 403/326 |
| 2008/0193212 A1* | 8/2008 | Kaufman | F16B 12/38 403/408.1 |
| 2012/0291240 A1 | 11/2012 | Suzuki | |
| 2013/0164099 A1* | 6/2013 | Rosemann | B60R 13/0206 411/508 |
| 2014/0319808 A1 | 10/2014 | Yamamoto | |

FOREIGN PATENT DOCUMENTS

| | | |
|---|---|---|
| JP | 2013-113419 A | 6/2013 |
| JP | 2013-180725 A | 9/2013 |
| JP | 2013-224057 A | 10/2013 |

* cited by examiner

[FIG. 1]
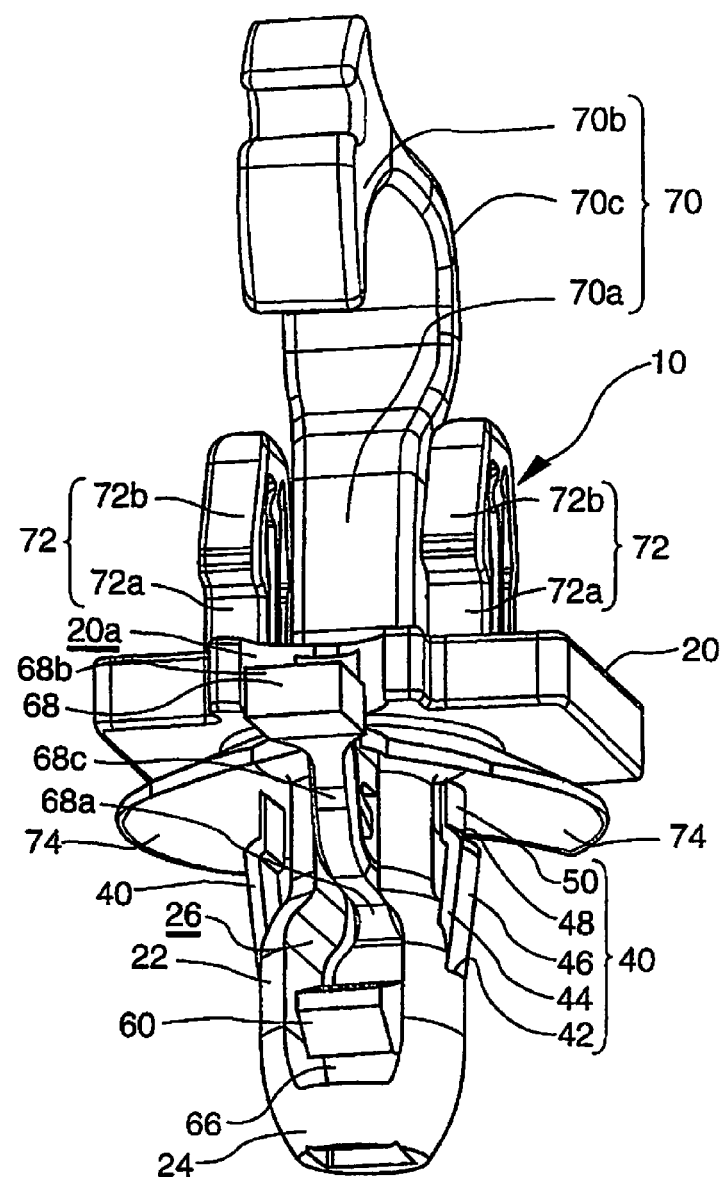

[FIG. 2]
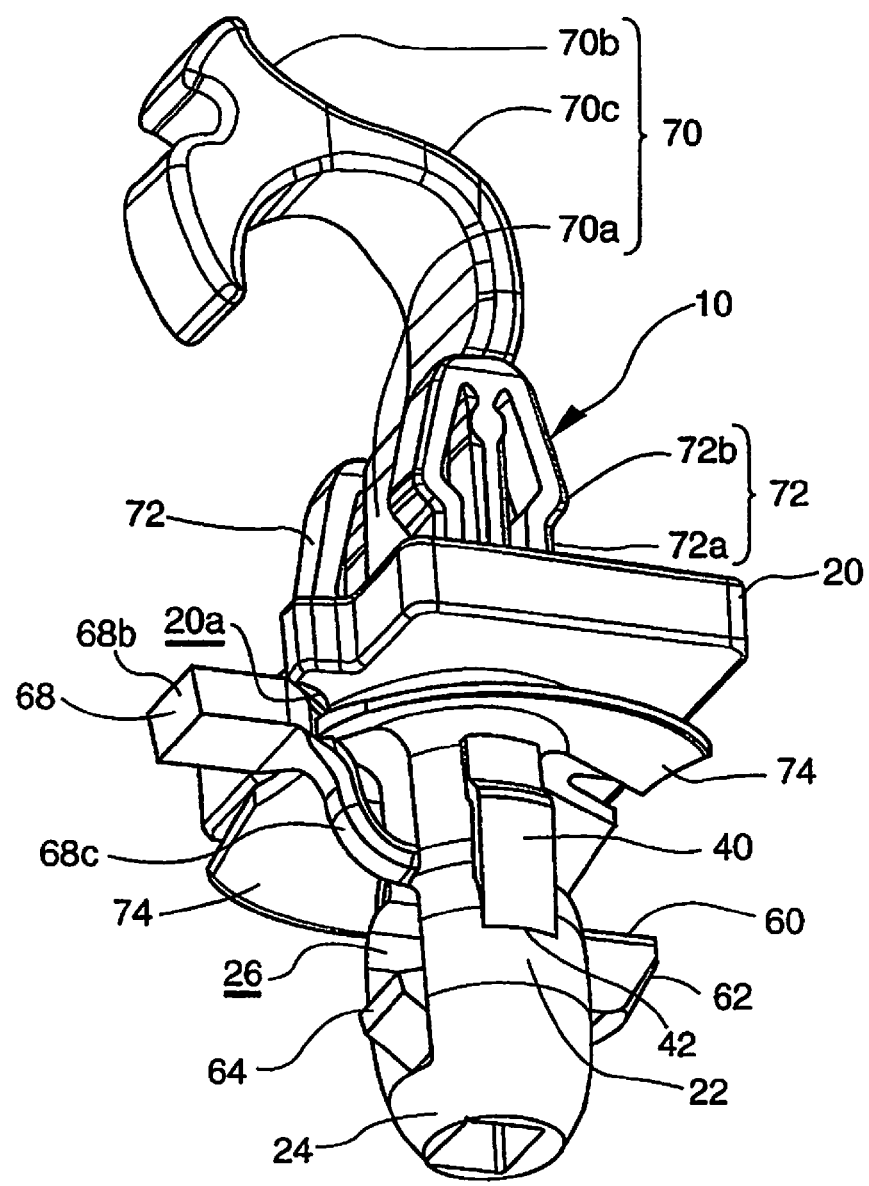

[FIG. 3]
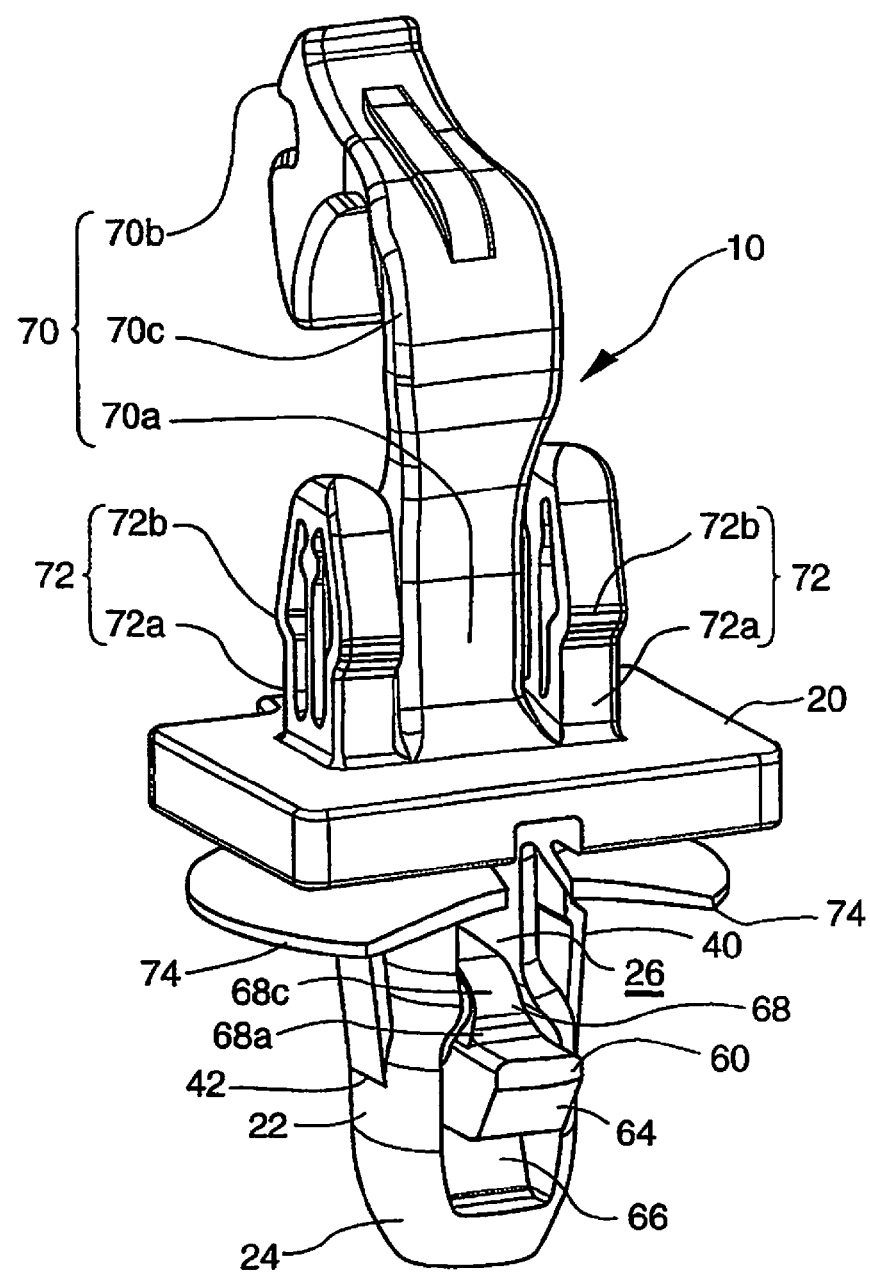

[FIG. 4]
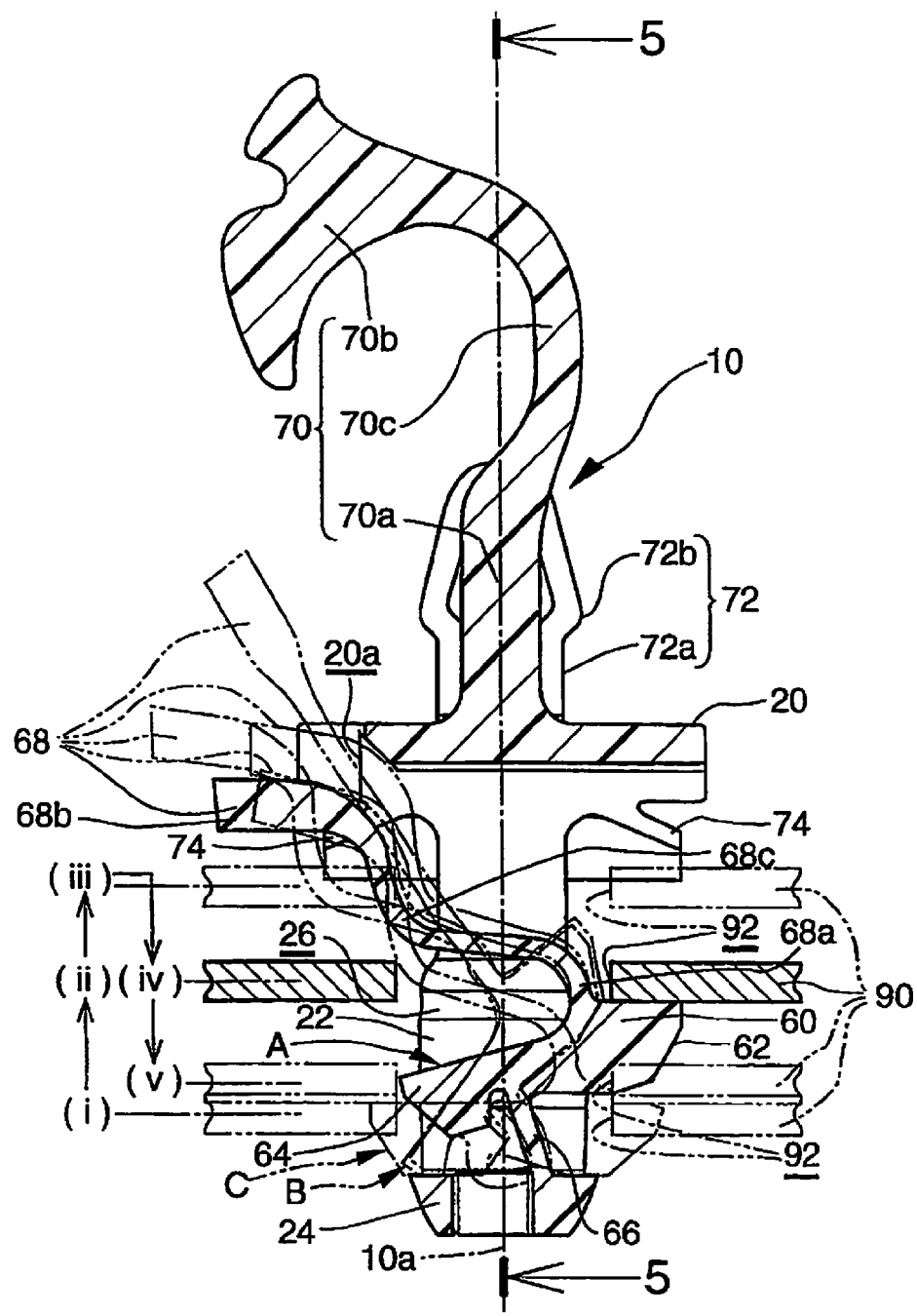

[FIG. 5]
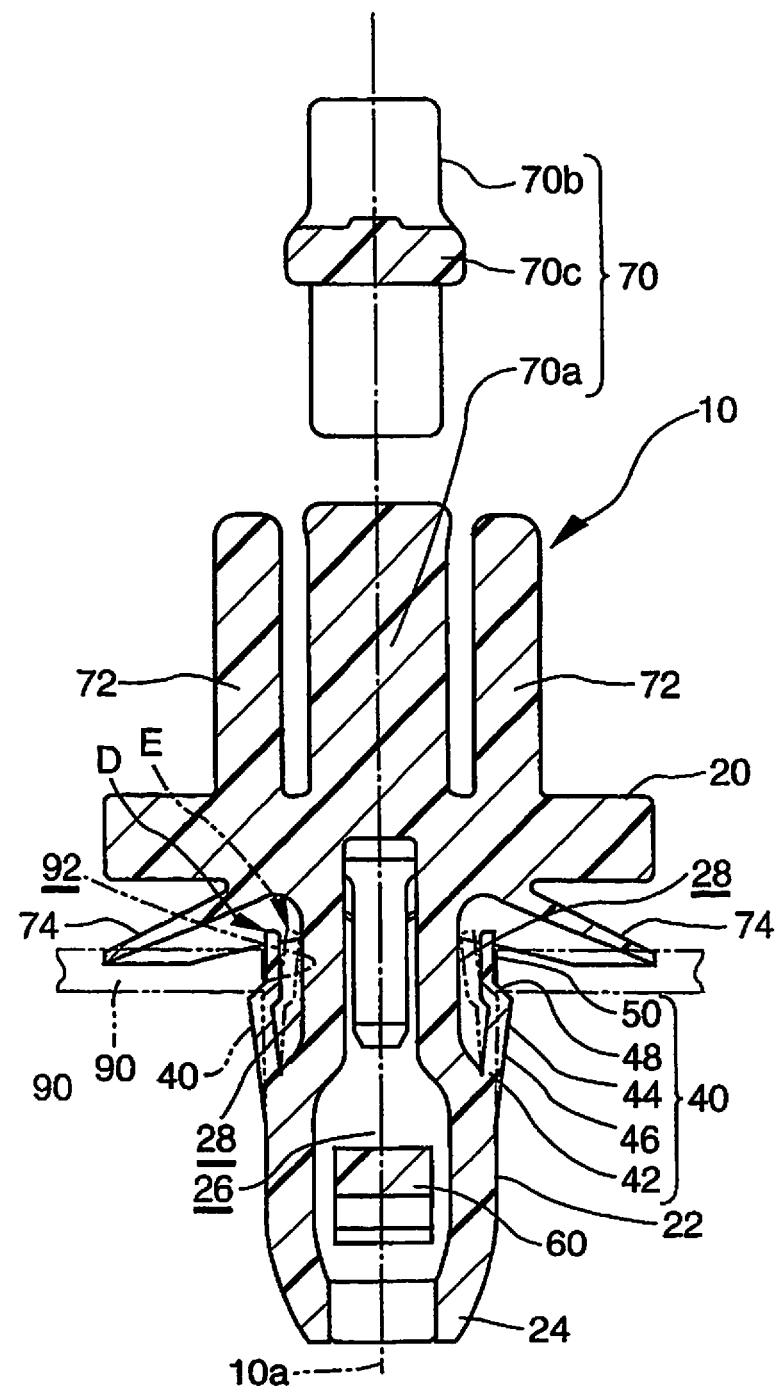

[FIG. 6]
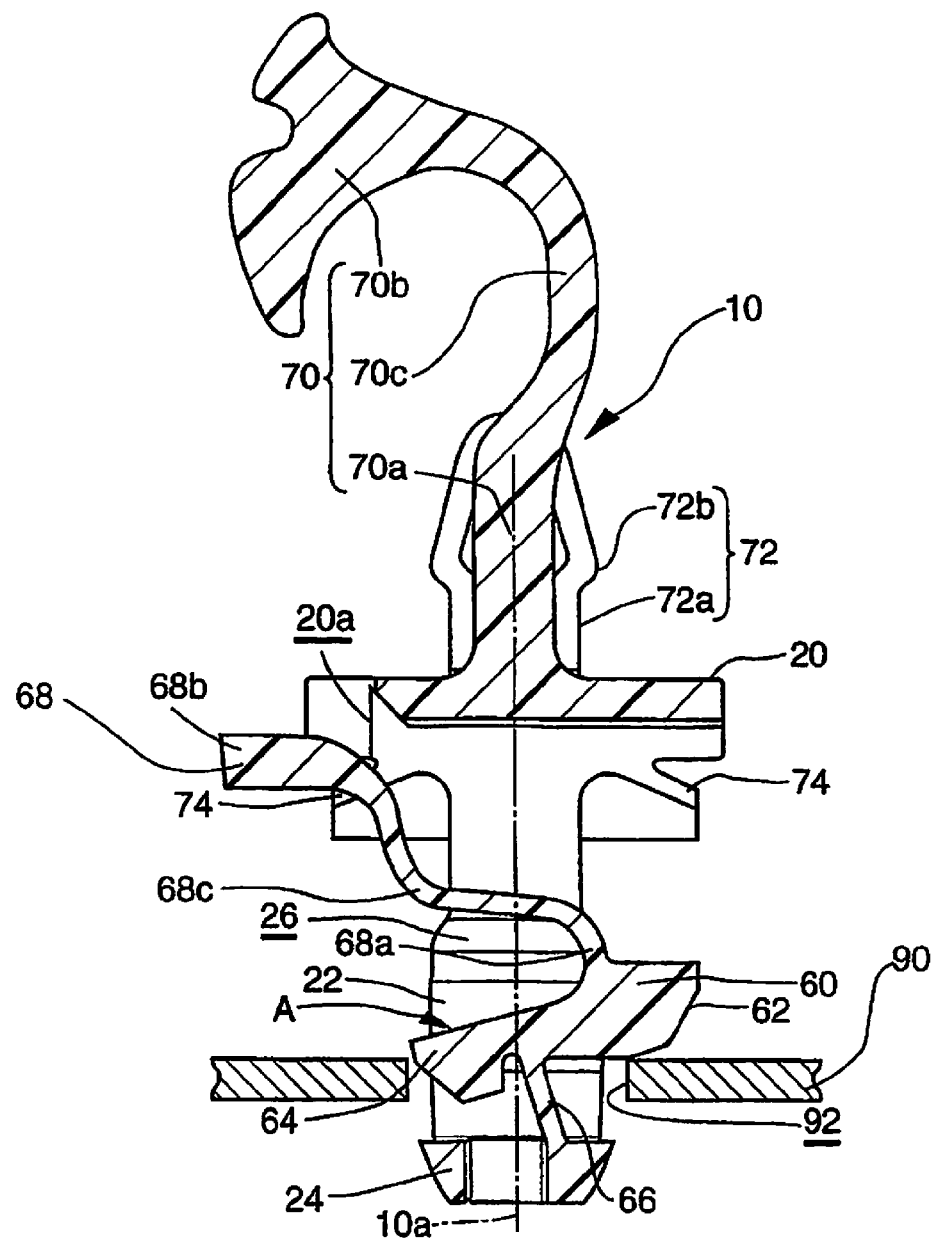

[FIG. 7]
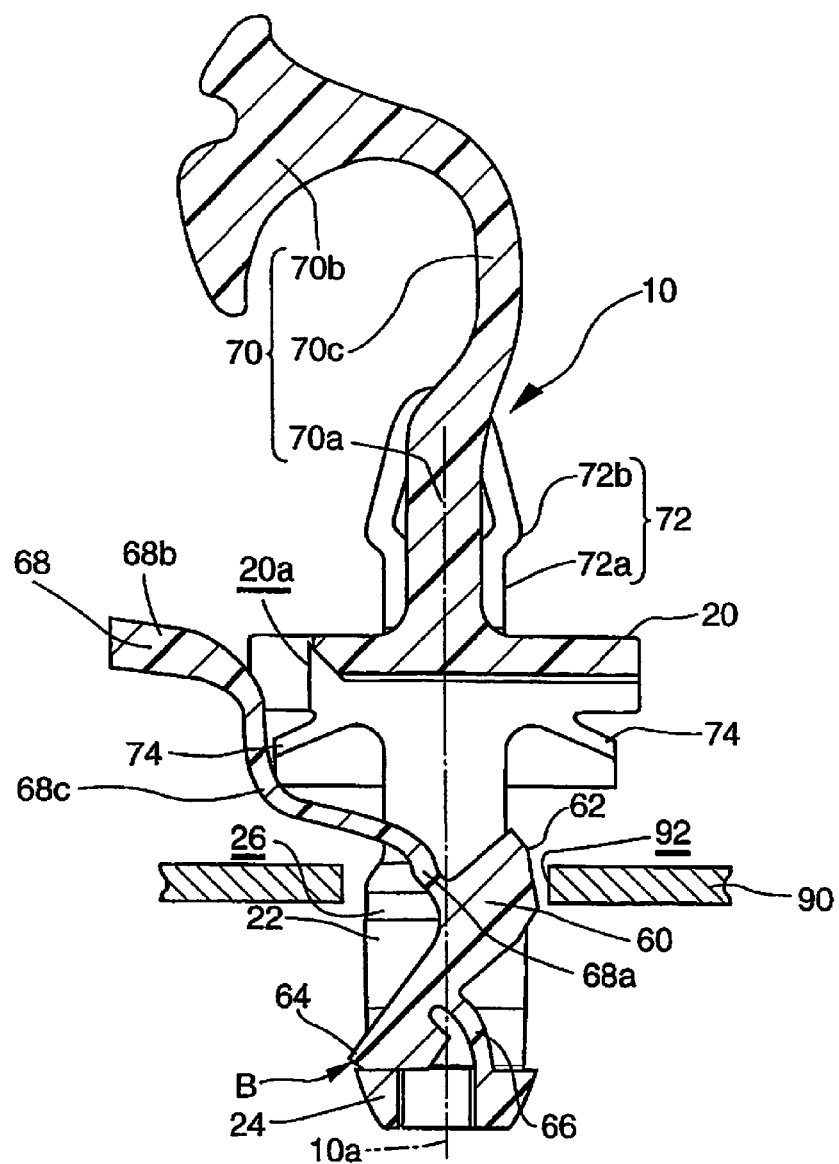

[FIG. 8]
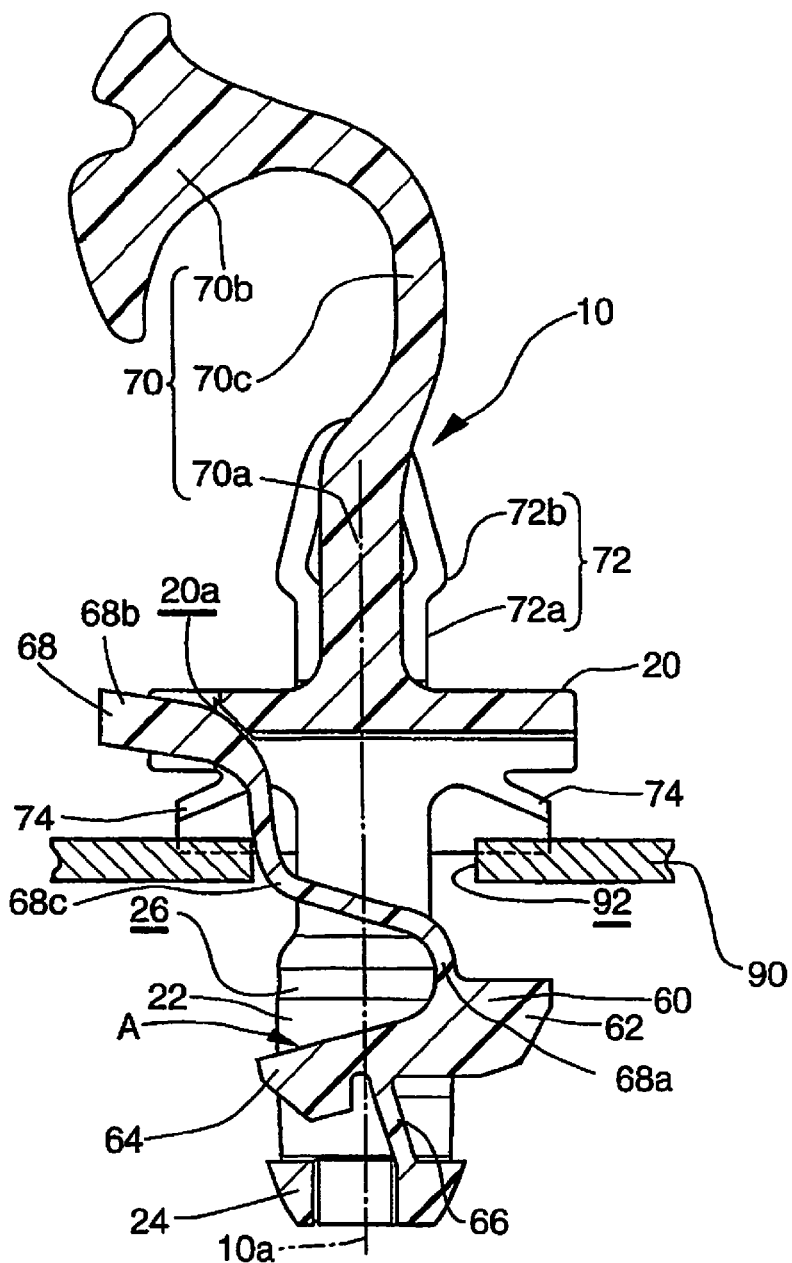

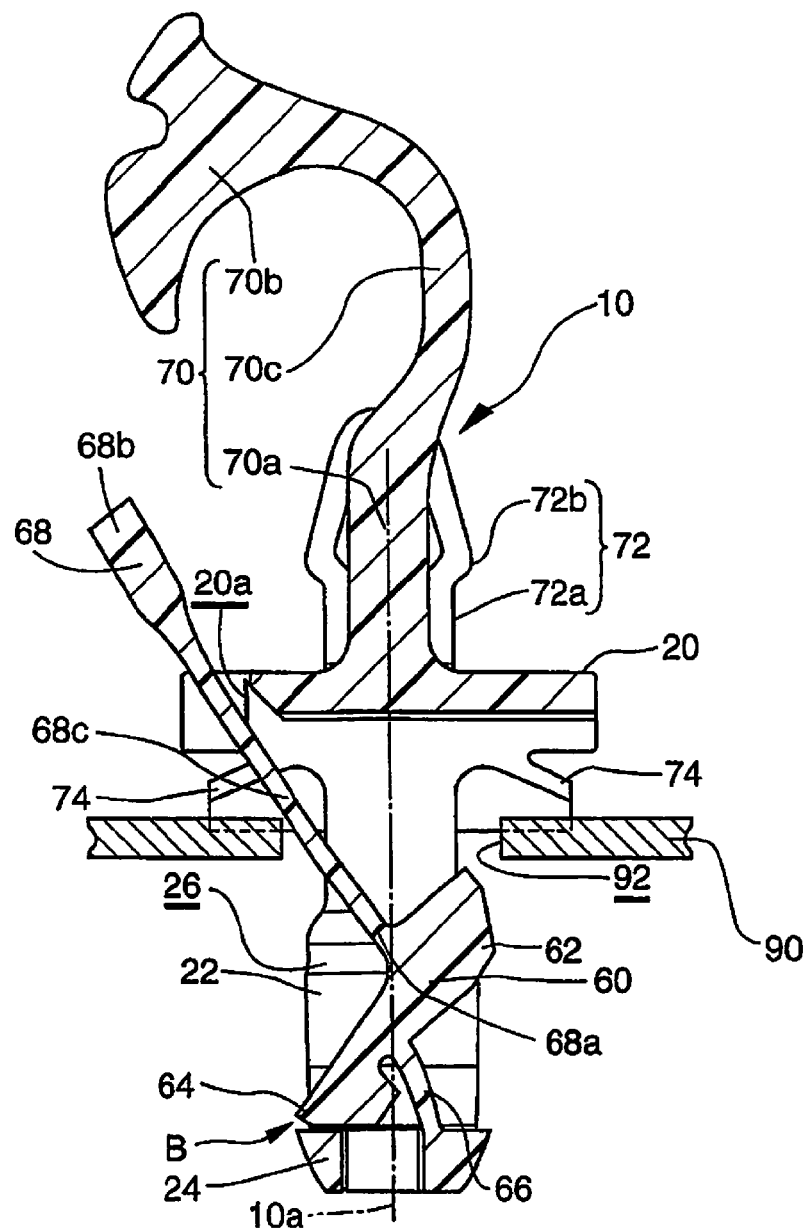
[FIG. 9]

[FIG. 10]
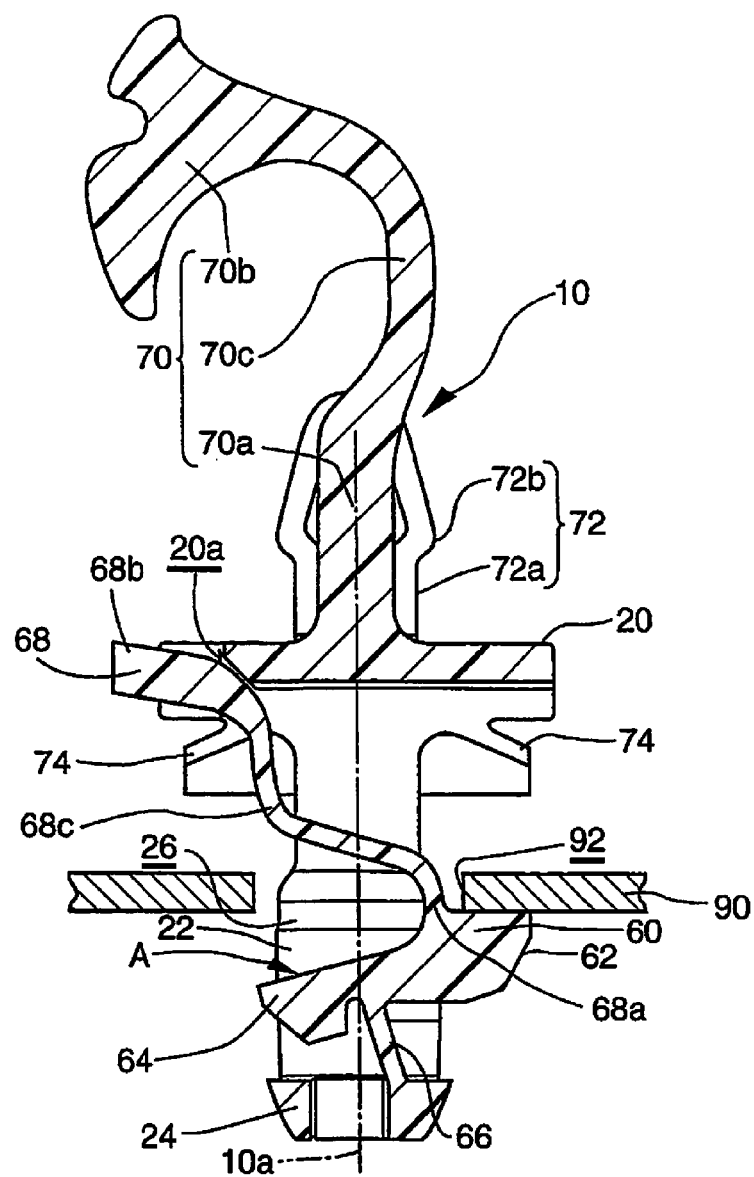

[FIG. 11]
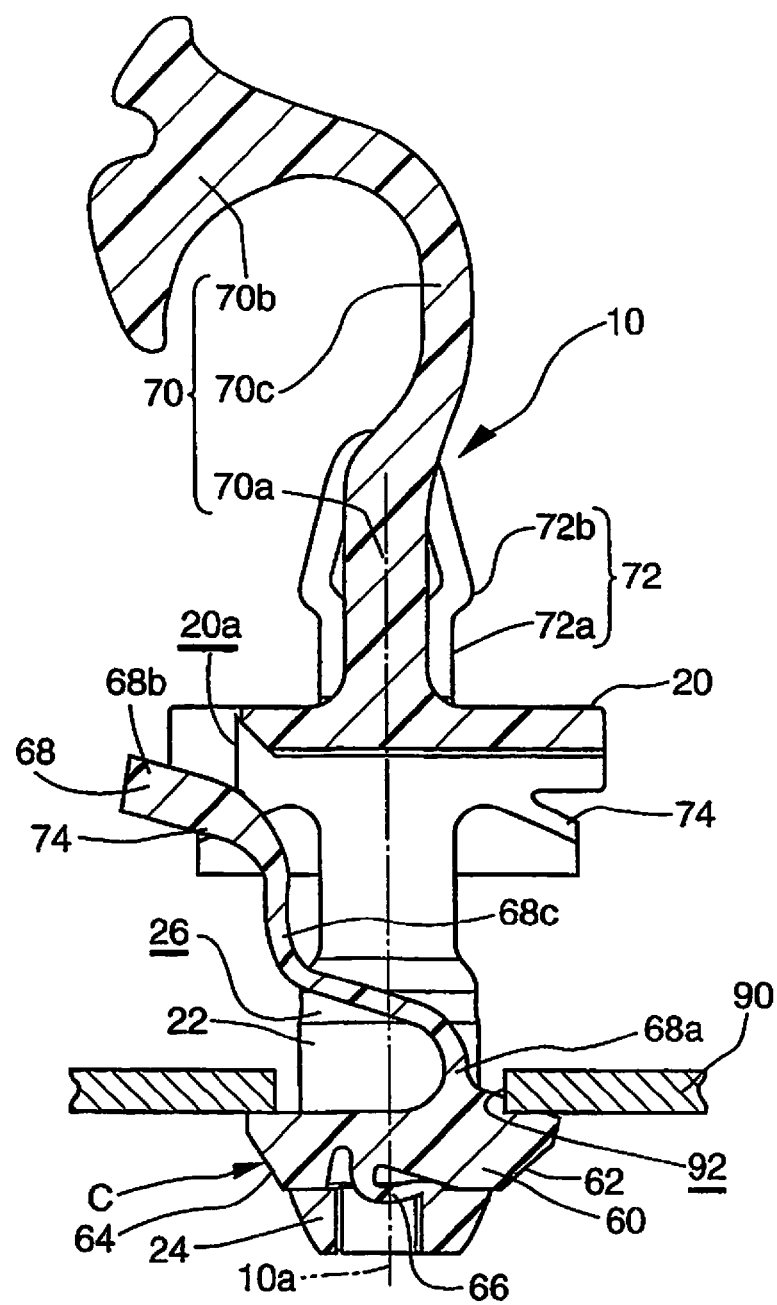

[FIG. 12]
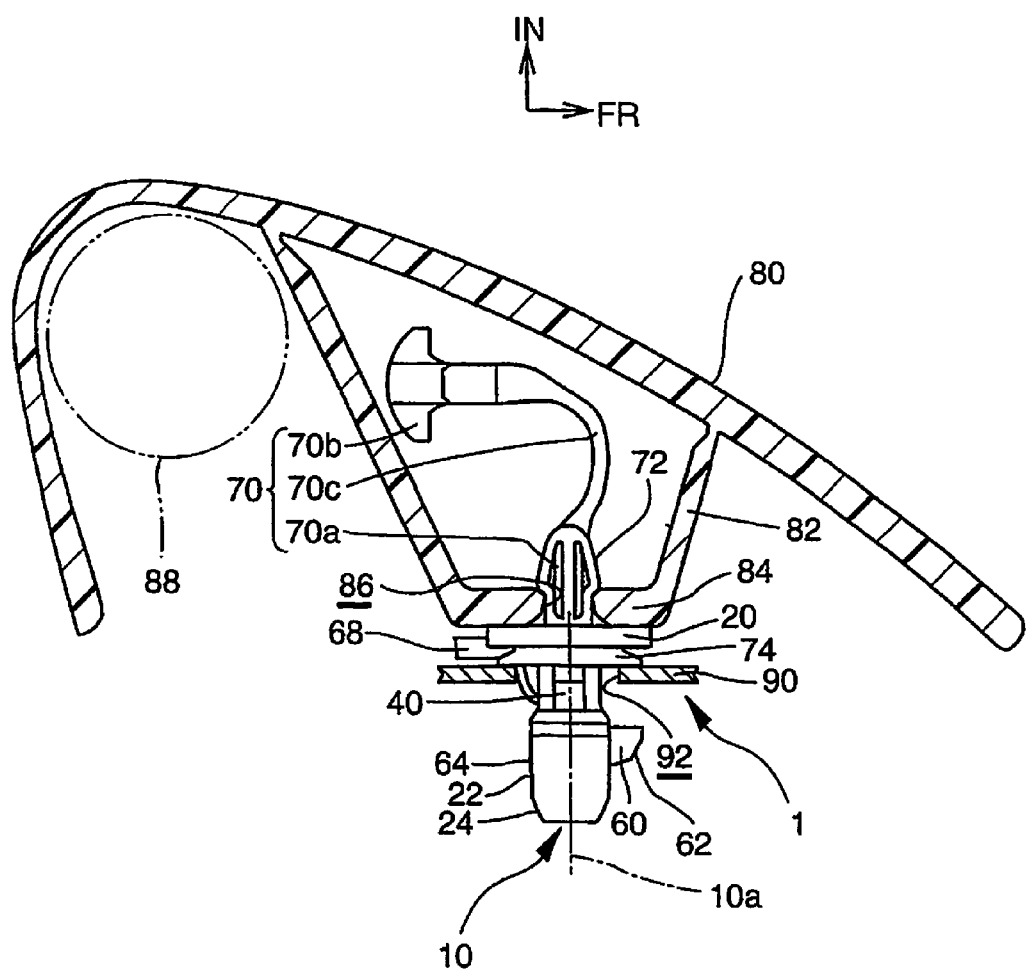

[FIG. 13]
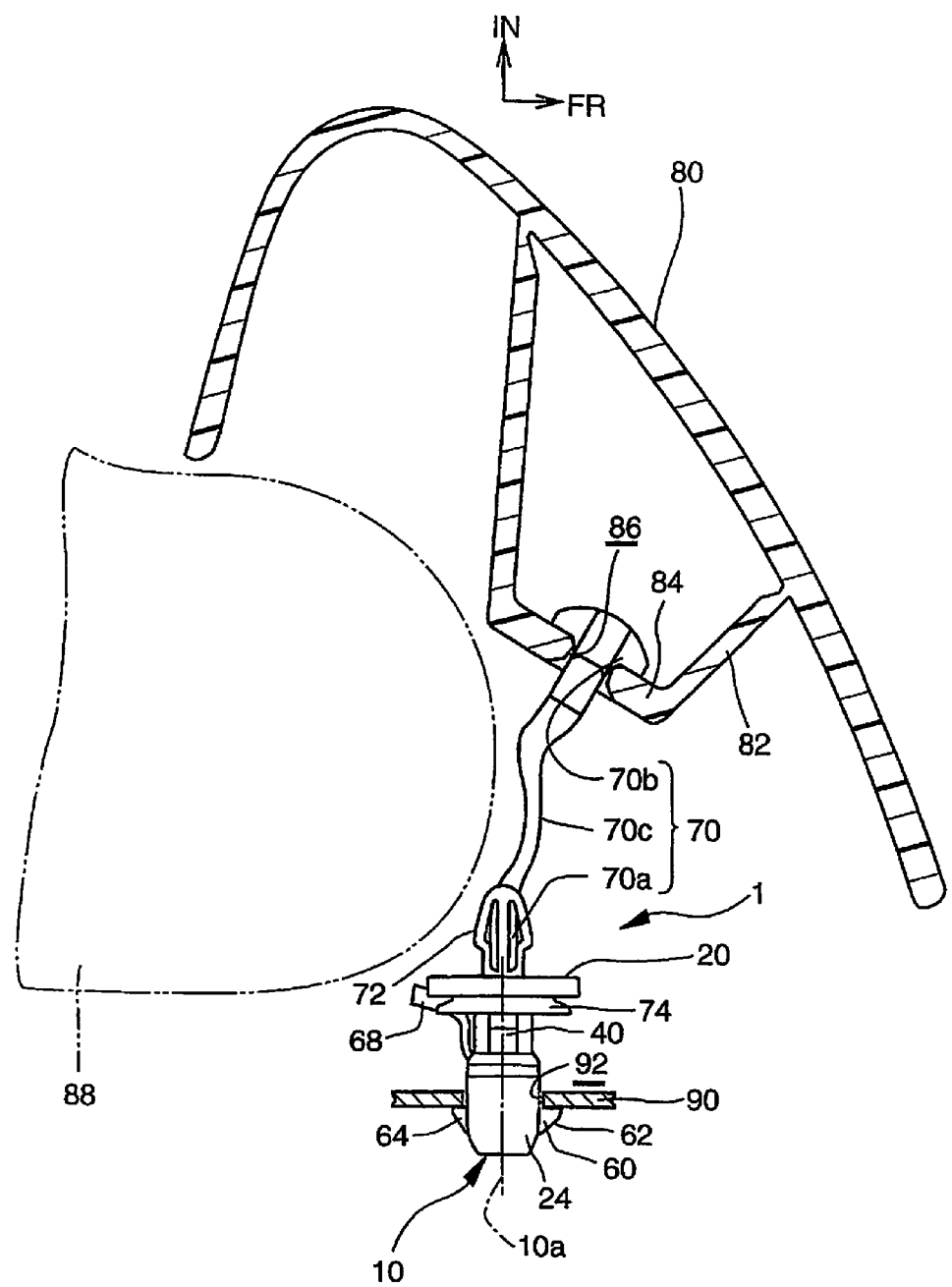

CLIP AND PILLAR GARNISH FIXING STRUCTURE

TECHNICAL FIELD OF THE INVENTION

This application relates to a clip and a pillar garnish fixing structure using the clip. In the descriptions below, the words "structure" and "fix" may be replaced by "apparatus" and "mount," respectively.

BACKGROUND OF THE INVENTION

Patent Documents 1 and 2 below disclose a clip for fixing a pillar garnish, which is a member, to a pillar, which is a body. The conventional clip has one kind of engagement hook. Even if the one kind of engagement hook includes a pair of engagement hooks, the positions of the engagement hooks are equal to each other in an axial direction of the clip. Only when the clip is in a normal fitting with the body can the member be installed on the body at a normal fixing position.

RELATED ART DOCUMENT

Patent Document 1: Patent Publication JP 2013-113419
Patent Document 2: Patent Publication JP 2013-180725

BRIEF SUMMARY

However, there are the following problems with the conventional clip:

A first problem is that a difference between a position of the member relative to the body when the clip is in a normal fitting with the body and a position of the member relative to the body when the clip is in a non-fitting state or a half-fitting state with the body is small. Even if the member looks as if it is fixed to the body, there is a possibility that the clip is in a non-fitting state or a half-fitting state with the body. Here, a "normal fitting" state is defined as a state where a shaft of the clip is inserted into a body engagement aperture of the body, and all engagement hooks are brought into engagement with a back surface of a rim that defines the body engagement aperture. Further, a "non-fitting" state is defined as a state where any of the engagement hooks is not in engagement with the back surface of the body, and a "half-fitting" state is defined as a state where one of paired engagement hooks is in engagement with the back surface of the body while the other of the paired hooks is not in engagement with the back surface of the body.

A second problem is that the clip only fixes the member to the body at a normal fixing position when the clip is in the normal fitting with the body. As a result, in a case where the clip has been fitted to the body at a non-fitting state or a half-fitting state, when a large external load is loaded on the clip or the member, there is a possibility that the member is removed from the body together with the clip.

An object of the application is to provide a clip and a pillar garnish fixing structure using the clip. According to the application, even if the clip has been fixed to a body in a non-fitting state or a half-fitting state, the state can be easily recognized from an external appearance of the member, and even if the clip has been fixed to the body in a non-fitting state or a half-fitting state with the body, inadvertent removal of the clip from the body can be prevented.

Means for Solving the Problem

A clip and a pillar garnish fixing structure according to the present application for achieving the above object can take the aspects or embodiments described below. In this connection, reference numerals in brackets correspond to reference numerals shown in the accompanying drawings.

In a first aspect of the present application, a clip (10) is used for fixing a member (80) to a body (90) at a body engagement aperture (92).

The clip (10) includes: a first engagement hook (40) that is configured to engage with a rim defining a body engagement aperture (92) when the clip (10) is in a normal fitting with the body (90); and a second engagement hook (60) spaced from the rim defining the body engagement aperture (92) when the clip (10) is in the normal fitting with the body (90). The second engagement hook (60) is brought into engagement with the rim defining the body engagement aperture (92) when the first engagement hook (40) has been disengaged from the body (90), thereby preventing the clip (10) from being removed from the body (90).

The second engagement hook (60) is located at a position deeper than the first engagement hook (40) in an inserting direction of the clip into the body engagement aperture (92).

In the first aspect of the present application, the clip (10) further includes a seat (20) and a shaft (22) extending in a direction away from the seat (20). Paired first engagement hooks (40) each constructed from the first engagement hook are provided at the shaft (22) such that the paired first engagement hooks (40) are opposed to each other in a direction perpendicular to a center axis line (10a) of the clip. An opening (26) is provided at the shaft (22) so as to penetrate the shaft (22) in a direction perpendicular to the direction in which the paired first engagement hooks (40) are opposed.

The second engagement hook (60) is disposed in the opening (26) such that the second engagement hook (60) is elastically deformable in the direction perpendicular to the direction in which the paired first engagement hooks (40) are opposed.

In a second aspect of the present application, the clip (10) further includes an engagement releasing portion (68).

The engagement releasing portion (68) includes a connecting end (68a) located at a first end of the engagement releasing portion (68) and a handling portion (68b) located at a second, opposite end of the engagement releasing portion (68). The engagement releasing portion (68) is connected to the second engagement hook (60) at the connecting end (68a). The handling portion (68b) is provided such that the handling portion (68b) is accessible when the clip (10) is removed from the body (90).

In a third aspect of the present application, the engagement releasing portion (68) includes an intermediate portion (68c) having a deformability and formed as a strap. The intermediate portion (68c) extends between the connecting end (68a) and the handling portion (68b). The intermediate portion (68c) extends from a side closer to a tip of the shaft (22) than the body (90), through the body engagement aperture (92), to a side closer to the seat (20) than the body (90), when the clip (10) is in the normal fitting with the body (90).

In a fourth aspect of the present application, the handling portion (68b) of the engagement releasing portion (68) includes a portion located outside a configuration of the seat (20).

In a fifth aspect of the present application, the seat (20) has a groove (20a) formed at a portion of the seat (20) with which the handling portion (68b) of the engagement releasing portion (68) interferes when the clip (10) is in the normal fitting with the body (90). The groove (20a) is open to an outside of the seat at a laterally outside surface and axially opposite surfaces of the seat (20). The engagement releasing portion (68) extends through the groove (20*a*) of the seat.

In a sixth aspect of the present application, the member (80) includes a rack portion (82). The handling portion (68*b*) of the engagement releasing portion (68) is located between the rack portion (82) and the body (90) when the clip (10) is in the normal fitting with the body (90).

In a seventh aspect of the present application, the clip (1) further includes a deformable connecting portion (66). The second engagement hook (60) is connected via the deformable connecting portion (66) to a tip (24) of the shaft located farther from the seat (20) than the opening (26).

In an eighth aspect of the present application, the deformable connecting portion (66) is formed as a plate having a cross section, a thickness of which extends in the direction perpendicular to the direction in which the paired first engagement hooks (40) are opposed and a width of which extends in the direction in which the paired first engagement hooks (40) are opposed. The thickness is selected to be smaller than the width. The second engagement hook (60) can be elastically displaced in the direction perpendicular to the direction in which the paired first engagement hooks (40) are opposed.

In a ninth aspect of the present application, the second engagement hook (60) is constructed to be able to take three positions including an inclined position (A), an erected position (B) more erected than the inclined position (A), and a lateral position (C) more lateral than the inclined position (A). The second engagement hook (60) is constructed so as to be able to be displaced over the three positions.

At the inclined position (A), only one end portion (62) of the second engagement hook (60) is located at a position more outward than a position corresponding to an inner diameter of the body engagement aperture (92).

At the erected position (B), an entirety of the second engagement hook (60) is located at a position equal to or more inward than the position corresponding to the inner diameter of the body engagement aperture (92).

At the lateral position (C), at least one end portion (62, 64) of the second engagement hook (60) is located at a position more outward than the position corresponding to the inner diameter of the body engagement aperture (92).

In a tenth aspect of the present application, when no load is loaded on the deformable connecting portion (66) at an early stage of insertion of the clip (10) into the body engagement aperture (92), the second engagement hook (60) takes the inclined position (A).

When the second engagement hook (60) is passing through the body engagement aperture (92) on a way of insertion of the clip (10) into the body engagement aperture (92), the second engagement hook (60) takes the erected position (B).

When the second engagement hook (60) has passed through the body engagement aperture (92), then the first engagement hook (40) is brought into engagement with the rim defining the body engagement aperture (92), and the second engagement hook (60) elastically returns to a free state of the second engagement hook, the second engagement hook (60) takes the inclined position (A).

When a pulling force is loaded on the engagement releasing portion (68) when removing the clip (10) from the body (90) at a time of service, the second engagement hook (60) takes the erected position (B).

When a pushing load is loaded on the deformable connecting portion (60) after the second engagement hook (60) has elastically returned to the free state, the second engagement hook (60) takes the lateral position (C).

In an eleventh aspect of the present application, when the second engagement hook (60) takes the lateral position (C), opposite end portions (62, 64) of the second engagement hook (60) are located more outward than the position corresponding to the inner diameter of the body engagement aperture (92).

In a twelfth aspect of the present application, in a state that the second engagement hook (60) is at the inclined position (A), the connecting end (68*a*) of the engagement releasing portion (68) with the second engagement hook (60) is located closer to the only one end portion (62) of the second engagement hook (60) than a connecting portion of the second engagement hook (60) with the deformable connecting portion (66).

In a thirteenth aspect of the present application, the first engagement hook (40) is connected to the shaft (22) at a hook connecting portion (42) spaced from the seat (20) and extends from the hook connecting portion (42) toward the seat (20) to end in a form of a free end. The first engagement hook (40) is separated from the shaft (22) except at the hook connecting portion (42).

The first engagement hook (40) includes a sliding-contact surface (46) and an engagement surface (48). The sliding-contact surface (46) is brought into sliding-contact with an inside surface of the body engagement aperture (92) when the clip (10) passes through the body engagement aperture (92). The engagement surface (48) is brought into engagement with the rim defining the body engagement aperture (92) in an axial direction of the clip when the clip (10) has been installed to the body (90).

The first engagement hook (40) takes two positions including an outer position (D) and an inner position (E) and is elastically deformable between the two positions. At the outer position (D), the engagement surface (48) of the first engagement hook (40) is located at a position equal to or more outward than a position of an inner diameter of the body engagement aperture (92) in a diametrical direction of the body engagement aperture (92). At the inner position (E), the sliding-contact surface (46) is located at a position equal to or more inward than the position of the inner diameter of the body engagement aperture (92) in the diametrical direction of the body engagement aperture (92).

In a fourteenth aspect of the present application, the clip (10) is a tether clip including a tether (70) which has an anchor (70*b*) at a tip of the tether.

In a fifteenth aspect of the present application, the tether (70) of the tether clip (10) is curved in a direction parallel to or perpendicular to a longitudinal direction of the member (80). The engagement releasing portion (68) is curved in the same direction as the direction in which the tether (70) is curved.

In a pillar garnish fixing structure (1) according to a sixteenth aspect of the present application, the member (80) is a pillar garnish and the body (90) is a pillar panel of a vehicle, and the pillar garnish (80) is installed to the pillar panel (90) using the tether clip (10) according to the fourteenth aspect.

According to the first aspect, the following technical advantages are obtained: since the second engagement hook is provided so as to be located deeper (i.e., closer to the tip of the shaft of the clip) than the first engagement hook in an inserting direction of the clip into the body engagement aperture, when the first engagement hook has been disengaged from the body due to a non-fitting or half-fitting of the first engagement hook with the body, the second engagement hook is brought into engagement with a back surface of the body. In that case, the member is lifted away from surrounding members to an extent that the amount that is lifted away can be recognized by sight. As a result, it is easily recognized from an external appearance that the clip is in the non-fitting or half-fitting with the body. Therefore, overlooking that the clip is not in the normal fitting with the body is prevented or substantially prevented from happening. Further, even if the clip has been coupled to the body in the non-fitting or half-fitting with the body, removal of the clip and the member from the body can be prevented from happening by the second engagement hook.

Further, since the second engagement hook is disposed so as to be deformable in the opening of the shaft, the second engagement hook can take a position where the second engagement hook is housed in the opening and another position where at least an end portion of the second engagement hook is located outside the opening. By taking the position where the second engagement hook is housed in the opening, the second engagement hook can pass through the body engagement aperture when the clip is inserted into the body engagement aperture or when the clip is removed from the body through the body engagement aperture. Further, by taking the position where at least an end portion of the second engagement hook is located outside the opening, even when the first engagement hook is disengaged from the body, the second engagement hook can be engaged with the rim defining the body engagement aperture, thereby preventing the clip from being removed from the body. Further, since the second engagement hook is elastically deformable in the direction in which the paired first engagement hooks are opposed, the second engagement hook can be displaced independently of the deformation of the paired first engagement hooks.

According to the second aspect, since the clip includes the engagement releasing portion, by pulling the engagement releasing portion, the second engagement hook can be displaced so that the clip can be removed from the body. As a result, removability of the clip at a time of service can be improved. Further, since the handling portion of the engagement releasing portion is disposed at an accessible place, access to the handling portion at the time of service is easy.

According to the third aspect, since the intermediate portion of the engagement releasing portion extends towards a seat side through the body engagement aperture, the engagement releasing portion can be led from a shaft side (access to which is difficult) to the seat side (to which access is possible), so that the handling portion of the engagement releasing portion can be placed at a position to which access is easy.

According to the fourth aspect, since the handling portion of the engagement releasing portion includes a portion located outside the configuration of the seat, the handling portion of the engagement releasing portion can be handled by fingers or a jig without being hindered by the seat.

According to the fifth aspect, since the engagement releasing portion extends through the groove of the seat to the handling portion of the engagement releasing portion, the handling portion of the engagement releasing portion can be handled by fingers or a jig without being hindered by the seat, so that handling the engagement releasing portion is easy.

According to the sixth aspect, since the handling portion of the engagement releasing portion is located between the rack portion of the member and the body (unlike a case where the handling portion is located inside a rack portion or is located deeper than the body), access to the handling portion is possible when the member is lifted away from the body.

According to the seventh aspect, since the second engagement hook is connected to the tip portion of the shaft via the deformable connecting portion, the second engagement hook can be elastically displaced relative to the shaft. As a result, by pulling the engagement releasing portion, the second engagement hook can be changed in position. Further, the clip may be formed integrally with the second engagement hook by injection molding.

According to the eighth aspect, since the thickness of the deformable connecting portion in the direction perpendicular to the direction in which the paired first engagement hooks are opposed is smaller than the width of the deformable connecting portion in the direction in which the paired first engagement hooks are opposed, the second engagement hook can be elastically displaced in the direction perpendicular to the direction in which the paired first engagement hooks are opposed.

According to the ninth aspect, when the second engagement hook is in the inclined position, only one end portion of the second engagement hook is located at a position that is more outward than a position corresponding to an inner diameter of the body engagement aperture. Therefore, even if the first engagement hook is disengaged from the body, removal of the clip from the body can be prevented by the second engagement hook. When the second engagement hook is in the erected position, an entirety of the second engagement hook is located at a position equal to or more inward than the position corresponding to the inner diameter of the body engagement aperture. Therefore, the second engagement hook can pass through the body engagement aperture. As a result, fixing the clip to the body and removing the clip from the body are easy. Since a load at a time of fixing the clip to the body and removing the clip from the body becomes small, any damage that may be incurred by the clip at the times of fixing and removing is decreased, so that the clip can be used again. When the second engagement hook is in the lateral position, at least one end portion of the second engagement hook is located at a position more outward than the position corresponding to the inner diameter of the body engagement aperture. Therefore, even if a large load is loaded on the second engagement hook, the second engagement hook can endure the load and prevents the clip from being removed from the body.

According to the tenth aspect, the following technical advantages are obtained: At an early stage of insertion of the clip into the body engagement aperture, the second engagement hook takes the inclined position. Therefore, the clip can be inserted into the body engagement aperture at a light force until the second engagement hook is brought into contact with the rim defining the body engagement aperture. When the second engagement hook is passing through the body engagement aperture on a way of insertion of the clip into the body engagement aperture, the second engagement hook takes the erected position. Therefore, the second engagement hook can pass through the body engagement aperture.

When the second engagement hook has elastically returned to a free state after the second engagement hook has passed through the body engagement aperture, the second engagement hook takes the inclined position. Therefore, even if the first engagement hook is in a non-fitting state or half-fitting state with the rim defining the body engagement aperture, removal of the clip from the rim defining the body engagement aperture can be prevented by the second engagement hook.

When a pulling force is loaded on the engagement releasing portion when removing the clip from the body at a time of service, the second engagement hook takes the erected position. Therefore, the second engagement hook can pass through the body engagement aperture, so that removal of the clip from the rim defining the body engagement aperture is easy.

When a pushing force is loaded on the deformable connecting portion after the second engagement hook has elastically returned to the free state, the second engagement hook takes the lateral position. Therefore, removal of the clip from the rim defining the body engagement aperture can be prevented.

According to the eleventh aspect, when the second engagement hook takes the lateral position, opposite end portions of the second engagement hook are located at a position more outward than the position corresponding to the inner diameter of the body engagement aperture. Therefore, the opposite end portions of the second engagement hook engage the rim defining the body engagement aperture, so that removal of the clip from the rim defining the body engagement aperture can be surely prevented.

According to the twelfth aspect, the connecting end of the engagement releasing portion with the second engagement hook is located closer to the only one end portion of the second engagement hook than the connecting portion of the second engagement hook with the deformable connecting portion. Therefore, when the engagement releasing portion is pulled, the second engagement hook can easily take the erected position.

According to the thirteenth aspect, since the first engagement hook can take the inner position, the first engagement hook can pass through the body engagement aperture by taking the inner position.

Further, since the first engagement hook can take the outer position, the first engagement hook can engage the back surface of the rim defining the body engagement aperture by taking the outer position. When the engagement surfaces of all first engagement hooks are brought into engagement with the back surface of the rim defining the body engagement aperture, the clip is in the normal fitting state with the body.

According to the fourteenth aspect, since the clip is a tether clip, the conventional tether clip can be replaced by the clip according to the present invention, so that a non-fitting state or a half-fitting state of the tether clip with the body and disengagement of the tether clip from the body due to the non-fitting or half-fitting can be suppressed.

According to the fifteenth aspect, since the engagement releasing portion is curved in the same direction as the direction in which the tether is curved, the handling portion of the engagement releasing portion does not receive a pulling force from a curtain airbag when the curtain airbag is developed, so that the second engagement hook is not disengaged from the body.

According to the pillar garnish fixing structure according to the seventeenth aspect, a non-fitting or half-fitting of the clip with the body and free movement of the pillar garnish into a passenger room of a vehicle due to the non-fitting or half-fitting can be suppressed.

BRIEF DESCRIPTION OF THE DRAWINGS

FIG. 1 is a perspective view of a clip according to one embodiment of the present invention viewed in a certain direction;

FIG. 2 is a perspective view of the clip of FIG. 1 viewed in a direction different from the direction of FIG. 1;

FIG. 3 is a perspective view of the clip of FIG. 1 viewed in a direction different from the directions of FIG. 1 and FIG. 2;

FIG. 4 is a cross-sectional view of the clip of FIG. 1 at several stages of insertion of the clip into a body engagement aperture of a body;

FIG. 5 is a cross-sectional view of the clip of FIG. 4 taken along line 5-5 of FIG. 4;

FIG. 6 is a cross-sectional view of the clip of FIG. 4 at an early stage of insertion of the clip into the body engagement aperture;

FIG. 7 is a cross-sectional view of the clip of FIG. 4 at a time when a second engagement hook is being inserted;

FIG. 8 is a cross-sectional view of the clip of FIG. 4 at a normal time (when the clip is in a normal fitting with the body at a first engagement hook);

FIG. 9 is a cross-sectional view of the clip of FIG. 4 when the clip is being removed from the body;

FIG. 10 is a cross-sectional view of the clip of FIG. 4 when the first engagement hook has disengaged from the body and the second engagement hook has been brought into engagement with the body;

FIG. 11 is a cross-sectional view of the clip of FIG. 4 at a time when a large load has been generated such as a time when a curtain airbag (a curtain shield airbag or briefly, a "CSA", hereinafter) is being developed;

FIG. 12 is a cross-sectional view of a pillar garnish fixing structure using or including the clip of FIG. 4; and FIG. 13 is a cross-sectional view of the pillar garnish fixing structure of FIG. 12 at a time when the CSA is being developed.

DETAILED DESCRIPTION

A clip 10 and a pillar garnish fixing structure 1 according to an embodiment of the present invention will be explained with reference to FIGS. 1-13. A case where the clip 10 is a tether clip, and a pillar garnish is fixed to a body using the tether clip is taken as the embodiment.

Since a main portion of the pillar garnish fixing structure 1 is a clip 10, the clip 10 and the pillar garnish fixing structure 1 include the same main portion. FIGS. 1-10 illustrate the clip 10, and FIGS. 12 and 13 illustrate the pillar garnish fixing structure 1. In FIGS. 12 and 13, "FR" shows a front direction in a front-rear direction of a vehicle, and "IN" shows an inward direction in a width direction of the vehicle.

<<Structures and Operations>>

First, structures and operations of the clip 10 will be explained. FIGS. 1-13 illustrate that the clip 10 is a tether clip 10, (where since the tether clip is the same member as the clip, the tether clip is denoted with the same reference numeral as that of the clip). The clip 10 may be a clip other than a tether clip. More particularly, the clip 10 may be a usual clip for fixing a curtain shield airbag (CSA, hereinafter) 88 to a body 90. The body 90 may be a body (e.g., a body panel such as a pillar panel) of a vehicle or a usual structure other than the body of a vehicle.

The clip 10 is made from a synthetic resin having a deformability. The synthetic resin is, for example, polyamide resin such as polyhexamethylene adipamide. The synthetic resin may be a resin other than polyhexamethylene adipamide so long as the resin has a necessary strength for the clip.

The clip 10 is used for fixing a member 80 to be installed (e.g., a pillar garnish) to a body (e.g., a body panel) 90 at a body engagement aperture 92 formed in the body. The clip 10 includes a first engagement hook 40 and a second engagement hook 60. The first engagement hook 40 is a hook engaged with a rim that defines the body engagement aperture 92 (a rim defining the body engagement aperture 92, hereinafter) when the clip 10 is in a normal fitting with the body 90. The second engagement hook 60 is a hook spaced from the rim defining the body engagement aperture 92 when the clip 10 is in the normal fitting with the body 90. The second engagement hook 60 is brought into engagement with the rim defining the body engagement aperture 92 when the first engagement hook 40 has been disengaged from the body 90, thereby preventing the clip 10 from being removed from the body 90. The second engagement hook 60 is provided at the clip 10 at a position located deeper (closer to a tip of the clip) than the first engagement hook 40 in an inserting direction of the clip 10 into the body engagement aperture 92.

The clip 10 may be a clip that is removable from the body 90 or a clip that is not removable from the body 90. In the removable clip, when a certain or large axial load is added to the clip, the first engagement hook 40 is disengaged from the body 90. The non-removable clip is used as it is in a fitting with the body. An engagement releasing portion 68 described later is provided to the removable clip in the embodiment shown, but the clip provided with the engagement releasing portion 68 may be used as a non-removable clip.

The clip 10 further includes a seat 20 and a shaft 22 extending in a direction away from the seat 20. The shaft may be called a leg or a fixing portion to the body. The clip 10 includes a center axis line 10a. The seat 20 is perpendicular to the center axis line 10a of the clip and the shaft 22 extends on or parallel to the center axis line 10a of the clip (as shown in FIGS. 4 and 5). The shaft 20 includes a tip (or tip portion) 24 spaced from the seat 20 and an opening 26 formed in the shaft 22 between the seat 20 and the tip 24. The opening 26 penetrates the shaft 22 in a direction perpendicular to the center axis line 10a of the clip (i.e., in a diametrical direction of the shaft 22). A shape of a cross section of the shaft 22 in the direction perpendicular to the center axis line 10a of the clip may be substantially a circle or a rectangle. The rectangle may include a square. The configuration of the shaft 21 shown in the drawings is a circle.

A configuration of the shaft 22 is smaller than the body engagement aperture 92, and a configuration of the seat is larger than the body engagement aperture 92. In a case where the cross section of the shaft 22 is circular and the body engagement aperture 92 is circular, an outside diameter of the shaft 22 is smaller than a diameter of the body engagement aperture 92. Taking this structure, when the clip 10 is being inserted into the body engagement aperture 92, the shaft 22 can pass through the body engagement aperture 92, but the seat 20 can not pass through the body engagement aperture 92 and an insertion movement of the clip 10 stops when or before the seat 20 is brought into contact with the body 90.

The clip 10 may further include an elastic spacer 74 which is provided on the shaft 22—side of the seat 20 and is inclined in a direction away from the seat 20 and away from the center axis line 10a of the clip. The elastic spacer 74 may be formed integrally with the clip 10 as illustrated in FIG. 5, or may be formed separately from the clip 10 and disposed at a surface of the seat 20 opposite the shaft 22. A configuration of the elastic spacer 74 is larger than the body engagement aperture 92. When the clip 10 is being inserted into the body engagement aperture 92, the rim defining the body engagement aperture 92 is brought into contact with the elastic spacer 74 and deforms the elastic spacer 74, and then insertion of the clip 10 stops.

At least one first engagement hook 40 is provided. In the embodiment shown, a pair of first engagement hooks 40 is provided. Preferably, paired first engagement hooks 40 (i.e., two first engagement hooks in a pair) are provided. The paired engagement hooks 40 are disposed on opposite sides of the center axis line 10a of the clip and are opposed to each other. In contrast, only one second engagement hook 60 is provided. The second engagement hook 60 is provided so as to extend in a direction perpendicular to a direction in which the first engagement hooks 40 are opposed.

The first engagement hook 40 is connected to the shaft 22 at a hook connecting portion 42 spaced from 20 and extends from the hook connecting portion 42 toward the seat 20 to end at a free end. The first engagement hook 40 is separated from the shaft 22 except at the hook connecting portion 42. More particularly, as illustrated in FIG. 5, a concave portion 28 is formed at a portion of the shaft 22 opposing the first engagement hook 40, and the first engagement hook 40 is disposed at the concave portion 28. The first engagement hook 40 is connected to the shaft 22 at the hook connecting portion 42 only, and an inside surface of the first engagement hook 40 is spaced from a surface of the concave portion 28. This structure may be replaced by another structure where an opening is formed at a wall of the shaft 22 so as to penetrate the wall of the shaft in a thickness direction of the wall, the first engagement hook 40 is disposed in the opening, the first engagement hook 40 is connected to the shaft 22 at the hook connecting portion 42 only, and the first engagement hook 40 is separated from the shaft 22 by only a slit (except at the hook connecting portion 42).

The first engagement hook 40 includes a protrusion 44, a sliding-contact surface 46 and an engagement surface 48. The protrusion 44 is inclined and extends in a direction away from the hook connecting portion 42 and towards the seat 20 and away from the center axis line 10a of the clip. The sliding-contact surface 46 is formed at an outside surface of the protrusion 44. The engagement surface 48 is formed at a surface of the protrusion 44 opposing the seat 20. The sliding-contact surface 46 is brought into sliding-contact with an inside surface of the body engagement aperture 92 when the clip 10 passes through the body engagement aperture 92. The engagement surface 48 is brought into engagement with the rim defining the body engagement aperture 92 in an axial direction of the clip when the clip 10 has been installed to the body 90. The first engagement hook 40 may further include an extended portion 50 extending from an inner end of the engagement surface 48 in a diametrical direction of the clip toward the seat 20 in the axial direction of the clip.

The first engagement hook 40 takes two positions ("position" may be replaced by "attitude") including an outer position D (a position shown by a full line in a left half of FIG. 5) and an inner position E (a position shown by a two-dotted line in a left half of FIG. 5) and is elastically deformable to rotate about the hook connecting portion 42 between the two positions. At the outer position D, the engagement surface 48 of the first engagement hook 40 is located at a position equal to or more outward than an inner diameter of the body engagement aperture 92 in a diametrical direction of the body engagement aperture 92. At the inner position E, the sliding-contact surface 46 is located at a position equal to or more inward than the inner diameter of the body engagement aperture 92 in the diametrical direction of the body engagement aperture 92.

When the clip 10 is inserted into the body engagement aperture 92 and the first engagement hook 40 passes through the body engagement aperture 92, the sliding-contact surface 46 is pushed inward by the inside surface of the body engagement aperture 92. As a result, the first engagement hook 40 takes the inner position E where the sliding-contact surface 46 is located at a position equal to or more inward than the inner diameter of the body engagement aperture 92 so that the first engagement hook 40 can easily pass through the body engagement aperture 92. Upon having passed through the body engagement aperture 92, the first engagement hook 40 returns to an original position due to its elasticity. As a result, the first engagement hook 40 takes the outer position D where the engagement surface 48 is located equal to or more outward than an inner diameter of the body engagement aperture 92 so that the engagement surface 48 is engaged with the rim defining the body engagement aperture 92 in the axial direction of the clip.

When the engagement surfaces 48 of all of the first engagement hooks 40 have been engaged with the back surface of the rim defining the body engagement aperture 92 in the axial direction of the clip, the clip 10 is in the normal fitting state with the body 90. When the clip 10 is in the normal fitting with the body 90, the rim defining the body engagement aperture 92 is located between the engagement surface 48 of the first engagement hook 40 and the seat 20 and is squeezed between the engagement surface 48 of the first engagement hook 40 and the spacer 74. At that time, because the spacer 74 is elastically pushed and deformed in the axial direction of the clip 10, a gap (an axial clearance of the clip) between the engagement surface 48 of the first engagement hook 40 and the body 90 is removed so that movement of the clip 10 relative to the body 90 is suppressed.

In a removable-type clip 10, it is desirable that the engagement surface 48 of the first engagement hook 40 is inclined so as to extend in a direction from an inner end to an outer end of the engagement surface 48 and away from the seat 20. Due to this inclination, a removal load that is loaded on the clip 10 from the body engagement aperture 92—defining rim of the body is more weakened than a case where the engagement surface 48 extends in a direction perpendicular to the center axis line 10 of the clip. As a result, removal of the clip 10 from the rim defining the body engagement aperture 92 at a time of service is possible or easy.

The second engagement hook 60 is disposed in the opening 26 of the shaft 22. The opening 26 penetrates the shaft 22 in the direction perpendicular to the direction in which the paired first engagement hooks 40 are opposed. The second engagement hook 60 extends along a plane perpendicular to the direction in which the paired first engagement hooks 40 are opposed. The second engagement hook 60 is connected via the deformable connecting portion 66 to the shaft 22, and more particularly, to the tip 24 of the shaft. The deformable connecting portion 66 is formed integrally with the tip 24 of the shaft 22 and integrally with the second engagement hook 60. The deformable connecting portion 66 is formed in a form of a plate having a cross section, a thickness of which extends in the direction perpendicular to the direction in which the paired first engagement hooks 40 are opposed (and a width of which extends in the direction in which the paired first engagement hooks 40 are opposed). The thickness of the deformable connecting portion 66 is smaller than the width of the deformable connecting portion 66 so that the second engagement hook 60 can be elastically displaced or is easily displaced in the direction perpendicular to the direction in which the paired first engagement hooks 40 are opposed.

In a type of clip that is removable from the body 90, the clip 10 includes an engagement releasing portion 68 connected to the second engagement hook 60 at one end of the engagement releasing portion 68, so that removal of the clip 10 from the body at the time of service is easy. The engagement releasing portion 68 includes a connecting end 68a to the second engagement hook 60 located at the one end of the engagement releasing portion 68, a handling portion 68b located at the other end of the engagement releasing portion 68, and a deformable connecting portion (which may be called an intermediate portion) 68c formed in a form of a string extending between the connecting end 68a and the handling portion 68b.

The handling portion 68b of the engagement releasing portion 68 is provided at a place where the handling portion 68b is accessible. The handling portion 68b is located closer to the seat 20 than to the body 90, and closer to the member 80 than to the body 90 when the clip 10 is in the normal fitting with the body 90. When the handling portion 68b must be handled, the member 80 is lifted away from the body 90 to generate a gap between the member 80 and the body 90, and then a hand or a handling jig or tool is inserted through the gap into a space between the member 80 and the body 90. In a case where the member 80 is a pillar garnish, the handling portion 68b is located outside a rack portion 82 (i.e., a tether housing portion) of the pillar garnish. This is because access to an interior of the rack portion 82 is difficult.

The engagement releasing portion 68 is formed in the form of a strap. Leading the engagement releasing portion 68 from the connecting end 68a to the handling portion 68b is conducted by causing the engagement releasing portion 68 to pass through the body engagement aperture 92. Therefore, the engagement releasing portion 68 extends from the connecting end 68a of the engagement releasing portion 68 located closer to the tip of the shaft 22 than the body 90, through the body engagement aperture 92 to the handling portion 68b located closer to the seat 20 than the body 90, when the clip 10 is in the normal fitting with the body 90.

It is desirable that at least a portion of the handling portion 68b is located outside a configuration (i.e., an outside surface) of the seat 20.

The seat 20 has a groove 20a formed at a portion of the seat 20 with which the handling portion 68b of the engagement releasing portion 68 interferes when the clip 10 is in the normal fitting state with the body 90. The groove 20a is open to an outside of the seat 20 at the laterally outside surface and axially opposite surfaces of the seat 20. The engagement releasing portion 68 extends through the groove 20a of the seat to the other end of the engagement releasing portion. At least one portion of the handling portion 68b is located inside the groove 20a, so that the releasing portion 68b can be pinched by fingers or the handling jig from axial opposite sides of the seat 20.

The second engagement hook 60 can take three postures ("posture" may be replaced by "position") including an inclined position (A), an erected position (B) more erected (more closer to the center axis line 10a of the clip) than the inclined position (A), and a lateral position (C) more lateral (i.e., closer to the direction perpendicular to the center axis line 10a of the clip) than the inclined position (A) and can be displaced over the three positions. The displacement of the second engagement hook 60 may be accompanied by an elastic deformation of the deformable connecting portion 66. As illustrated in FIGS. 4 and 6-11, in the inclined position (A), only one end portion 62 of the second engagement hook 60 is located or protrudes at a position more outward than a position corresponding to an inner diameter of the body engagement aperture 92. In the erected position (B), an entirety of the second engagement hook 60 is located at a position at a position equal to or more inward than the position corresponding to the inner diameter of the body engagement aperture 92. In the lateral position (C), at least one end portion 62, 64 of the second engagement hook 60 is located or protrudes at a position more outward than the position corresponding to the inner diameter of the body engagement aperture 92.

It is desirable that the connecting end 68a of the engagement releasing portion 68 with the second engagement hook 60 is located closer to the above only one end portion 62 of the second engagement hook 60 than a connecting portion of the second engagement hook 60 with the deformable connecting portion 66. Due to this structure, when the engagement releasing portion 68 is pulled, the second engagement hook 60 can easily take the erected position (B).

At an early stage of insertion of the clip 10 into the body engagement aperture 92, as illustrated in FIG. 6 and (i) of FIG. 4, the elastic connecting portion 66 is in a free state, and the second engagement hook 60 takes the inclined position A. When the second engagement hook 60 is at the inclined position A, an inserting load of the clip is substantially zero until the one end 62 of the second engagement hook 60 is brought into engagement with the rim defining the body engagement aperture 92.

When the shaft 22 is further inserted, the one end 62 of the second engagement hook 60 is pushed toward the seat 20 by the rim defining the body engagement aperture 92 so that the second engagement hook 60 is changed in inclination toward the erected position. When the second engagement hook 60 passes through the body engagement aperture 92, as illustrated in FIG. 7 and (ii) of FIG. 4, the second engagement hook 60 is at the erected position (B). At this state, the opposite ends 62 and 64 of the second engagement hook 60 are located at a position equal to or more inward than the position corresponding to the inner diameter of the body engagement aperture 92. As a result, the second engagement hook 60 can easily pass through the body engagement aperture 92, so that the clip 10 can be further inserted at a relatively light inserting force until the clip 10 is brought into the normal fitting with the body 90.

When the shaft 22 is further inserted from the state of FIG. 7 and (ii) of FIG. 4 and the sliding-contact surface 46 of the first engagement hook 40 sliding-contacts the inside surface of the body engagement aperture 92, the inserting force becomes large. When the sliding-contact surface 46 of the first engagement hook 40 has passed through the body engagement aperture 92, the inserting force of the clip becomes small for a moment. When the clip 10 is further inserted, the clip 10 receives a reaction force of the elastic spacer 74 so that the inserting force of the clip quickly becomes large again. By feeling a change of the inserting force and confirming by sight that the member 80 is not lifted away from the surrounding members, it is recognized that the clip 10 is brought into the normal fitting state with the body 90. FIG. 8 and state (iii) of FIG. 4 show that the clip 10 is in the normal fitting state with the body 90. When the clip 10 is in the normal fitting with the body 90, the rim defining the body engagement aperture 92 is elastically held between the engagement surface 48 of the first engagement hook 40 and the compressed spacer 74, a clearance between the engagement surface 48 of the first engagement hook 40 and the rim defining the body engagement aperture 92 becomes zero, so that the clip 10 and the member 80 do not shake relative to the body 90. At this state, the deformable connecting portion 66 has returned to its original position due to its elasticity and the second engagement hook 60 has returned its inclined state (A).

When the clip 10 is to be removed from the body, the member 80 is pulled in the direction away from the body 90 so that the first engagement hook 40 is disengaged from the body 90, and then a hand or a jig is inserted into the member 80 through the gap between the member 80 and the body 90. Then, the engagement releasing portion 68 is pinched and pulled. The deformable connecting portion 66 is elastically deformed and the second engagement hook 60 takes the erected position (B). When the handling portion 68b is pulled and the second engagement hook 60 takes the erected position (B), the other end 64 of the second engagement hook 60 is contacted with an upper surface of the tip 24 of the shaft 22, so that the second engagement hook 60 can surely hold the erected position. At that time, since an entirety of the second engagement hook 60 is moved and located at a position inside a diameter corresponding to the inner diameter of the body engagement aperture 92, the second engagement hook 60 can pass through the body engagement aperture 92 at a small drawing-out force. Therefore, serviceability is improved. A difference between FIG. 9 and FIG. 7 is that in FIG. 9, the engagement releasing portion 68 is straight or substantially straight because the engagement releasing portion 68 is pulled in order to remove the clip, while in FIG. 7, the engagement releasing portion 68 is in a free state and is curved.

When the clip 10 is pushed into the body engagement aperture 92 up to a normal fixing position, if the clip 10 stops before the clip 10 has not yet been inserted to the normal fixing position, the first engagement hook 40 will be brought into a non-fitting state or a half-fitting state with the rim defining the body engagement aperture 92. As already mentioned, in a case where two first engagement hooks 40 are provided as a pair, the "non-fitting state" is defined as a state where the two first engagement hooks 40 are not in the normal fitting state with rim defining the body engagement aperture 92, and the "half-fitting state" is defined as a state where one first engagement hook 40 is not in the normal fitting state with the rim defining the body engagement aperture 92. In the case where the pair of first engagement hooks 40 is in the non-fitting state or half-fitting state with the body, the pair of first engagement hooks is easily disengaged from the rim defining the body engagement aperture 92, and then the clip 10 can move in a drawing-out direction or can easily move in the drawing-out direction at a small drawing-out load. At that time, because the second engagement hook 60 has elastically returned to the inclined position (A) as shown in FIG. 10 and (iv) of FIG. 4, the second engagement hook 69 is brought into engagement with the rim defining the body engagement aperture 92 so that the clip 10 is prevented from being removed from the rim defining the body engagement aperture 92. As a result, even if the first engagement hook 40 is in a non-fitting state or half-fitting state with the body in the fitting shown in FIG. 8, the second engagement hook 60 acts to prevent removal of the clip 10 as illustrated in FIG. 10.

When the clip 10 is in the state shown in FIG. 10, a lifted-up amount of the member 80 from surrounding members is large to an extent that the amount is recognizable by sight. When the lifting away is recognized by sight, the member 80 is pushed again together with the clip 10 so that the first engagement hook 92 is brought into the normal fitting with the rim defining the body engagement aperture

92. The pushing is conducted by a worker of an interior mounting or service. When the lifting away is overlooked by the worker or the lifting away is generated after service, a user noticing the lifting away may conduct the pushing. Even if the first engagement hook 40 is in the non-fitting state or half-fitting state with the body, there is no risk because removal of the clip 10 is prevented by the second engagement hook 60.

When a large load is loaded on the clip 10 such as at a time when the CSA is developed, as illustrated in FIG. 11 and (v) of FIG. 4, the second engagement hook 60 is pushed by the rim defining the body engagement aperture 92, so that the second engagement hook 60 takes the lateral position (C), accompanying an elastic deformation of the deformable connecting portion 66. At that time, at least one end portion 62, desirably opposite end portions 62, 64 of the second engagement hook 60 protrude at a position more outward than a position corresponding to an inner diameter of body engagement aperture 92. Therefore, the end portion 62 or portions 62, 64 are pushed by the rim defining the body engagement aperture 92 and are squeezed between the tip 24 of the shaft and the rim defining the body engagement aperture 92. In this state, since the at least one end portion 62, and desirably the opposite end portions 62 and 64, engage the rim defining the body engagement aperture 92, the clip 10 is not removed from the body engagement aperture 92. As a result, the clip 10 can endure the large load such as at a time when the CSA is developed, and prevents the member 80 from being moved.

Next, in a case where the clip 10 is a tether clip 10 (which is denoted with the same reference numeral as that of the clip, because the tether clip is the same member as the clip), structures and effects of the tether clip 10 to be added to the structures and effects of the clip 10 above, and structures and effects of the pillar garnish fixing structure 1 using the tether clip 10 will be explained.

The pillar garnish fixing structure 1 includes the tether clip 10, a pillar 90 as the body 90 (since the pillar is the same element as the body, the pillar 90 is denoted with the same reference numeral as that of the body), and a pillar garnish 80 (since the pillar garnish is the same element as the member, the pillar garnish is denoted with the same reference numeral as that of the member).

The pillar garnish 80 is made from a plastic which is equal to or harder in hardness than the clip 10. As illustrated in FIGS. 12 and 13, the pillar garnish 80 is fixed to the pillar 90 (more particularly, a pillar inner panel) made from a steel plate by the tether clip 10. The pillar garnish 80 includes the rack portion (i.e., the tether housing portion) 82 for housing a tether 70 therein and for coupling the tether clip 10. At the bottom wall 84 of the rack portion 82, the tether inserting aperture 86 which is rectangular may be formed. The CSA 88 is housed in a space between the pillar 90 and the pillar garnish 80 in a folded state. When a car collision or a rolling-over happens, the CSA 88 is expanded and developed. A portion of the developed CSA 88 is shown in FIG. 13.

As illustrated in FIGS. 1-13, the tether clip 10 includes the tether 70 and a holding portion 72. Structures of a tether and a holding portion of a conventional tether clip may be applied to the tether 70 and the holding portion 72.

The tether 70 includes a rising portion 70a rising from the seat 20 in a direction opposite the shaft 22, an anchor 70b provided at a tip of the tether farther from the seat 20, and a tether connecting portion 70c connecting the rising portion 70a and the anchor 70b. The tether connecting portion 70c may be curved or may extend substantially straight. In the present embodiment shown, the tether connecting portion 70c is curved. The direction in which the tether connecting portion 70c is curved may be a width direction of the pillar garnish 80 which corresponds to a direction perpendicular to a longitudinal direction of the pillar garnish 80 as illustrated in FIGS. 12 and 13, or may be the longitudinal direction of the pillar garnish 80. In the case where the tether connecting portion 70c is curved in the width direction of the pillar garnish 80, it is desirable that the tether connecting portion 70c is curved in a direction toward the CSA 88 in order that a large gap for development of the CSA 88, generated between the pillar garnish 80 and the body 90 can be obtained when the CSA 88 is developed.

The engagement releasing portion 68 is curved. It is desirable that a curving direction of the engagement releasing portion 68 is selected to be the same direction as that of tether connecting portion 70c. Due to the curving direction of the engagement releasing portion 68, the engagement releasing portion 68 does not receive a pulling force from the CSA 88, though the engagement releasing portion 68 may receive a pushing force from the CSA 88.

The anchor 70b has a configuration which is rectangular and smaller than a configuration of the tether inserting aperture 86 formed at the rack portion 82 of the pillar garnish 80. When the tether 70 is inserted into the rack portion 82, at first a longitudinal direction of the rectangular configuration of the anchor 70b and a longitudinal direction of the rectangular configuration of the tether inserting aperture 86 are caused to coincide with each other, and then the anchor 70b is caused to pass through the tether inserting aperture 86. When the tether 70 has been inserted into the rack portion 82, the tether clip 10 is rotated about the center axis line 10a by 90 degrees so that the anchor 70b cannot be removed from the rack portion 82. Then, the tether clip 10 is further inserted into the rack portion 82 so that the holding portion 72 passes through the tether inserting aperture 72 and is brought into engagement with the bottom wall of the seat. When the tether clip 10 has been coupled to the pillar garnish 80, the pillar garnish 80 coupled with the tether clip 10 is pushed toward the pillar 90, so that the shaft 22 of the tether clip 10 is pushed into the body engagement aperture 92 of the pillar 90 whereby the pillar garnish 80 coupled with the tether clip 10 is fixed to the pillar 90. FIG. 12 shows a state where the pillar garnish 80 coupled with the tether clip 10 has been fixed to the pillar 90.

The holding portion 72 rises from the seat 20 in a direction opposite the shaft 22. The holding portion 72 is provided at the side of the rising portion 70a of the tether 70. The holding portion 72 is spaced from the rising portion 70a.

The holding portion 72 includes a rising portion 72a and a bulged portion 72b. The rising portion 72a of the holding portion 72 rises from the seat 20 by an amount substantially equal to a thickness of the bottom wall 84 of the rack portion where the tether inserting aperture 86 is provided. The bulged portion 72b further extends from a tip of the rising portion 72a in a direction away from the seat 20 and bulges in a direction perpendicular to a rising direction of the rising portion 72a. The bulged portion 72b is formed hollow so that the bulged portion 72b has an elasticity in the direction perpendicular to a rising direction of the rising portion 72a.

When the tether clip 10 is coupled to the pillar garnish 80, the holding portion 72 is pushed into the tether inserting aperture 86 of the rack portion 82. At this time, the bulged portion 72b is elastically deformed in a direction in which the bulging amount is decreased, so that the bulged portion 72b can pass through the tether inserting aperture 86 and is inserted to an inside of the rack portion 82. When the bulged portion 72*b* has passed through the tether inserting aperture 86, the bulged portion 72*b* returns to its original position (a free state position) and the bottom wall 84 of the rack portion is held between the bulged portion 72*b* and the bottom wall 20. Maintaining this state, the tether clip 10 is fixed to the pillar 90.

When the CSA is developed, the pillar garnish 80 is pushed by the CSA 88 in the direction away from the pillar 90. At that time, the bulged portion 72*b* of the holding portion 72 is pushed by the rim defining the tether inserting aperture 86 in a drawing-out direction of the pillar garnish. As a result, the bulged portion 72*b* is elastically deformed in a bulging amount decreasing direction, so that the rim defining the tether inserting aperture 86 passes the bulging portion 72*b*, and the bottom wall 84 of the rack portion is disengaged from the bulging portion 72*b* of the holding portion 72. As a result, the pillar garnish 80 can move until the anchor 70*b* of the tether 70 is brought into contact with the rim defining the tether inserting aperture 86 of the bottom wall 84 of the rack portion.

When the CSA is being developed and the pillar garnish 80 is pushed by the developing CSA 88 toward a passenger room of a vehicle, the pillar garnish 80 moves in the direction away from the pillar 90 until the anchor 70*b* is brought into contact with the rim defining the tether inserting aperture 86, so that a gap for allowing the CSA 88 to develop is formed between the pill garnish 80 and the pillar 90. When the anchor 70*b* is brought into contact with the rim defining the tether inserting aperture 86 as illustrated in FIG. 13, the pillar garnish 80 cannot further move, so that the pillar garnish 80 is prevented from being moved toward the passenger room.

As illustrated in FIG. 13, at a time of a collision of a vehicle and a roll-over of the vehicle, the CSA 88 is expanded and developed through the gap between the pillar 90 and the pillar garnish 80 into the passenger room, more particularly, to a space between the passenger and a side door to thereby restrict and protect a head of the passenger. At that time, the tether clip 10 allows the pillar garnish 80 to move by a certain amount so that a CSA development gap is formed, but restricts the pillar garnish 80 to move more than the certain amount so that the pillar garnish 80 is prevented from freely moving into the passenger room.

<<Technical Advantages>>

Next, technical advantages of the clip 10 and the pillar garnish fixing structure 1 using the clip 10 will be explained.

Since the second engagement hook 60 is provided so as to be located deeper than the first engagement hook 40 in the inserting direction of the clip into the body engagement aperture, when the first engagement hook 40 has been disengaged from the body 90 due to the non-fitting or half-fitting of the first engagement hook 10 with the body 90 and the second engagement hook 60 is brought into engagement with a back surface of the body 90, the member 80 lifts away from surrounding members to an extent that the lifted away amount can be recognized by sight. As a result, it is easily recognized from an external appearance that the clip 10 is in the non-fitting state or half-fitting state with the body 90. Therefore, overlooking that the clip 10 is not in the normal fitting with the body 90 is prevented or substantially prevented from happening. Further, even if the clip 10 has been coupled to the body 90 in the non-fitting state or half-fitting state with the body, removal of the clip 10 from the body 90 can be prevented by the second engagement hook 60.

Further, since one end of the engagement releasing portion 68 is connected to the second engagement hook 60, by pulling the engagement releasing portion 68, the second engagement hook 60 can be displaced so that the clip 10 can be removed from the body 90. As a result, removability of the clip 10 at a time of service can be improved. Further, since the other end of the engagement releasing portion 68 is disposed at an accessible place, access to the other end of the engagement releasing portion 68 is easy.

Further, since the second engagement hook 60 is connected via the deformable connecting portion 66 to the shaft 22, the second engagement hook 60 can be elastically displaced relative to the shaft 22. The second engagement hook 60 can be displaced over the three positions including the inclined position (A), the erected position (B) and the lateral position (C).

At the inclined position (A), since the one end 62 of the second engagement hook 60 is located at a position more outward than the position corresponding to the inner diameter of the body engagement aperture 92, even if the first engagement hook 40 is disengaged from the body 90, removal of the clip 10 from the body 90 can be prevented by the second engagement hook 60. At the erected position (B), since an entirety of the second engagement hook 60 is located at a position equal to or more inward than the position corresponding to the inner diameter of the body engagement aperture 92, the second engagement hook 60 can easily pass through the body engagement aperture 92, so that it is easy to fix the clip 10 to the body 90 and to remove the clip 10 from the body 90. Further, since a load at the time of inserting the clip 10 to the body 90 and removing the clip 10 from the body 90 is small, damage incurred by the clip 10 at the time of inserting and removing is decreased, so that the clip 10 can be used again. At the lateral position (C), since at least one end portion of the second engagement hook 60 is located, and more desirably, the opposite ends 62 and 64 are located, at a position more outward than the position corresponding to the inner diameter of the body engagement aperture, even if a CSA developing load acts to the clip 10, the second engagement hook 60 can endure the load.

Further, when the tether clip 10 is in the normal fitting state with the pillar, the engagement releasing portion 68 extends from a clip shaft side located closer to the shaft 22 than the body 90 to a clip seat side located closer to the seat 20 than the body 90 through the body engagement aperture 92. Therefore, it is possible to lead the engagement releasing portion 68 from the clip shaft side (an access to which is difficult) to the clip seat side (an access to which is possible). As a result, it becomes possible to locate the other end (the handling portion 68*b*) of the engagement releasing portion 68 at a place to which access is easy.

Since the handling portion 68*b* of the engagement releasing portion 68 is located outside the configuration of the seat 20, it is possible to handle the handling portion 68*b* of the engagement releasing portion 68 by fingers or a tool without being hindered by the seat 20.

Since the engagement releasing portion 68 extends through the groove 20*a* up to the other end of the engagement releasing portion, it is possible to handle the handling portion 68*b* of the engagement releasing portion 68 by fingers or a tool substantially without being hindered by the seat 20, so that handling the releasing portion 68 is easy.

By taking the inner position (E), the first engagement hook 40 can pass through the body engagement aperture 92. By taking the outer position (D), the first engagement hook 40 can engage the back surface of the rim defining the body engagement aperture 92. When the engagement surfaces of all first engagement hooks 40 are brought into engagement with the back surface of the rim defining the body engagement aperture 92, the clip 10 is put in the normal fitting with the body 90.

In a case where the clip 10 is a tether clip, replacing a conventional tether clip by the clip 10 according to the present invention, a non-fitting state or a half-fitting state of the tether clip 10 with the body 90 and a removal of the tether clip 10 from the body thereby can be prevented from happening Since the second engagement hook 60 is disengaged from the body 90 when the handling portion 68b of the engagement releasing portion 68 is pulled, it is desirable that the second engagement hook 60 does not receive a pulling force from the CSA 88 to thereby prevent the second engagement hook 60 from being disengaged from the body 90. In the embodiment, since the engagement releasing hook 68 is curved in a direction toward the CSA 88 like the tether 70, the handling portion of the engagement releasing portion 68 does not receive a pulling force from the expanding and developing CSA 88 (which might give a pushing force to the engagement releasing portion 68), so that the second engagement hook 60 can be prevented from being disengaged from the body 90 by a pulling force from the CSA 88.

In the case of the pillar garnish fixing apparatus 1 using the clip 10, a non-fitting state or half-fitting state of the clip 10 can be prevented from happening, whereby a disengagement of the clip 10 from the body due to the non-fitting or half-fitting of the clip 10 accompanied by a non-restricted movement of the pillar garnish 88 into the passenger room at the time of development of the CSA 88 can be prevented from happening. Though the explanation has been made to the tether clip 10 and the pillar garnish fixing apparatus 1 using the tether clip 10 taken as the embodiments, the explanation above can be applied to a member, which is required not to be disengaged at the time of a collision of a vehicle but is desirable to be easily disengaged at the time of service, such as a bumper cover and a normal CSA fixing clip.

The invention claimed is:

1. A clip used for fixing a member to be installed on a body at a body engagement aperture, the clip comprising:
   a seat;
   a shaft extending in a direction away from the seat;
   a pair of first engagement hooks that are provided at the shaft, the pair of first engagement hooks being opposed to each other in a direction perpendicular to a center axis line of the clip, and being configured to engage with a rim defining a body engagement aperture when the clip is in a normal fitting state with the body;
   a second engagement hook spaced from the rim defining the body engagement aperture when the clip is in the normal fitting state with the body, the second engagement hook being brought into engagement with the rim defining the body engagement aperture when the pair of first engagement hooks have been disengaged from the body, thereby preventing the clip from being removed from the body; and
   an engagement releasing portion including (i) a connecting end located at a first end of the engagement releasing portion, and (ii) a handling portion located at a second, opposite end of the engagement releasing portion, wherein
      the second engagement hook is located at a position deeper than the pair of first engagement hooks in an inserting direction of the clip into the body engagement aperture;
      an opening is provided at the shaft so as to penetrate the shaft in a direction perpendicular to the direction in which the pair of first engagement hooks are opposed;
      the second engagement hook is disposed in the opening such that the second engagement hook is elastically deformable in the direction perpendicular to the direction in which the pair of first engagement hooks are opposed,
      the engagement releasing portion is connected to the second engagement hook at the connecting end, and
      the handling portion is provided such that the handling portion is accessible when the clip is removed from the body.

2. The clip according to claim 1, wherein
   the engagement releasing portion includes an intermediate portion having a deformability and formed in a form of a strap, the intermediate portion extending between the connecting end and the handling portion, and
   the intermediate portion extends from a side closer to a tip of the shaft than the body, through the body engagement aperture, to a side closer to the seat than the body, when the clip is in the normal fitting with the body.

3. The clip according to claim 1, wherein the handling portion of the engagement releasing portion includes a portion located outside a configuration of the seat.

4. The clip according to claim 1, wherein
   the seat has a groove formed at a portion of the seat with which the handling portion of the engagement releasing portion interferes when the clip is in the normal fitting with the body, the groove being open to an outside of the seat at a laterally outside surface and axially opposite surfaces of the seat, and
   the engagement releasing portion extends through the groove of the seat.

5. The clip according to claim 1, wherein
   the member to be installed includes a rack portion, and
   the handling portion of the engagement releasing portion is located between the rack portion and the body when the clip is in the normal fitting state with the body.

6. The clip according to claim 1, further comprising a deformable connecting portion, and wherein the second engagement hook is connected via the deformable connecting portion to a tip of the shaft located farther from the seat than the opening.

7. The clip according to claim 6, wherein
   the deformable connecting portion is formed as a plate having a cross section, a thickness of the plate extending in the direction perpendicular to the direction in which the pair of first engagement hooks are opposed, and a width of the plate extending in the direction in which the pair of first engagement hooks are opposed, and the thickness is smaller than the width, and
   the second engagement hook can be elastically displaced in the direction perpendicular to the direction in which the pair of first engagement hooks are opposed.

8. The clip according to claim 6, wherein
   the second engagement hook is constructed to be able to take three positions including an inclined position, an erected position more erected than the inclined position, and a lateral position more lateral than the inclined position, and the second engagement hook is constructed so as to be able to be displaced over the three positions,
   at the inclined position, only one end portion of the second engagement hook is located more outward than a position corresponding to an inner diameter of the body engagement aperture, at the erected position, an entirety of the second engagement hook is located equal to or more inward than the position corresponding to the inner diameter of the body engagement aperture, and at the lateral position, at least one end portion of the second engagement hook is located more outward than the position corresponding to the inner diameter of the body engagement aperture.

9. The clip according to claim 8, wherein when no load is loaded on the deformable connecting portion at an early stage of insertion of the clip into the body engagement aperture, the second engagement hook takes the inclined position, when the second engagement hook is passing through the body engagement aperture on a way of insertion of the clip into the body engagement aperture, the second engagement hook takes the erected position, when the second engagement hook has passed through the body engagement aperture, then the pair of first engagement hooks is brought into engagement with the rim defining the body engagement aperture, and the second engagement hook elastically returns to a free state of the second engagement hook, the second engagement hook takes the inclined position, when a pulling load is loaded on the engagement releasing portion when removing the clip from the body at a time of service, the second engagement hook takes the erected position, and when a pushing force is loaded on the deformable connecting portion after the second engagement hook has elastically returned to the free state, the second engagement hook takes the lateral position.

10. The clip according to claim 8, wherein when the second engagement hook takes the lateral position, opposite end portions of the second engagement hook are located more outward than the position corresponding to the inner diameter of the body engagement aperture.

11. The clip according to claim 8, wherein in a state that the second engagement hook is at the inclined position, the connecting end of the engagement releasing portion with the second engagement hook is located closer to the only one end portion of the second engagement hook than a connecting portion of the second engagement hook with the deformable connecting portion.

12. The clip according to claim 1, wherein each of the pair of first engagement hooks is connected to the shaft at a hook connecting portion spaced from the seat, and extends from the hook connecting portion toward the seat to end in a free end, each of the pair of first engagement hooks being separated from the shaft except at the hook connecting portion, each of the pair of first engagement hooks includes a sliding-contact surface and an engagement surface, the sliding-contact surface being brought into sliding-contact with an inside surface of the body engagement aperture when the clip passes through the body engagement aperture, the engagement surface being brought into engagement with the rim defining the body engagement aperture in an axial direction of the clip when the clip has been installed to the body, and each of the pair of first engagement hooks takes two positions including an outer position and an inner position and are elastically deformable between the two positions, at the outer position the engagement surface of the each of the pair of first engagement hooks is located equal to or more outward than an inner diameter of the body engagement aperture in a diametrical direction of the body engagement aperture, at the inner position the sliding-contact surface being located equal to or more inward than the inner diameter of the body engagement aperture in the diametrical direction of the body engagement aperture.

13. The clip according to claim 1, wherein the clip is a tether clip including a tether which has an anchor at a tip of the tether.

14. The clip according to claim 13, wherein the tether of the tether clip is curved in a direction parallel to or perpendicular to a longitudinal direction of the member, and the engagement releasing portion is curved in the same direction as the direction in which the tether is curved.

15. A pillar garnish fixing structure, wherein the member is a pillar garnish, and the body is a pillar panel of a vehicle, and the pillar garnish is installed to the pillar panel using the tether clip according to claim 13.

* * * * *